United States Patent [19]
Suzuki et al.

[11] Patent Number: 5,751,354
[45] Date of Patent: May 12, 1998

[54] IMAGE SENSING APPARATUS AND METHOD WITH EXPOSURE PERFORMED BASED ON FOCUS EVALUATION VALUES

[75] Inventors: Masao Suzuki, Tokyo; Saburo Nakazato, Yokohama, both of Japan

[73] Assignee: Canon Kabushiki Kaisha, Tokyo, Japan

[21] Appl. No.: 423,732

[22] Filed: Apr. 18, 1995

[30] Foreign Application Priority Data

Apr. 28, 1994 [JP] Japan .................... 6-114171
Apr. 28, 1994 [JP] Japan .................... 6-114173

[51] Int. Cl.$^6$ .................. H04N 5/232; H04N 5/235; H04N 5/238
[52] U.S. Cl. ................. 348/349; 348/296; 348/350; 348/353; 348/364; 348/365; 348/367
[58] Field of Search .................. 348/222, 224, 348/228, 229, 230, 345, 347, 348, 349, 354, 362, 363, 364, 366, 367, 296, 350, 353, 365; 396/89, 121, 124, 125, 130

[56] References Cited

U.S. PATENT DOCUMENTS 5,223,935  6/1993  Tsuji et al. .................... 358/228
5,368,137  11/1994  Suga et al. .................... 348/302
5,376,964  12/1994  Soga et al. .................... 348/229
5,473,375  12/1995  Takayama et al. ............ 348/364
5,565,917  10/1996  Takayama et al. ............ 348/354

Primary Examiner—Andrew Faile
Assistant Examiner—Ngoc-Yen Vu
Attorney, Agent, or Firm—Robin, Blecker, Daley and Driscoll

[57] ABSTRACT

A digital electronic camera has a first stroke switch and a second stroke switch. When the first stroke switch is pressed, adjustment of focus, coarse adjustment of exposure and detection of light-source flicker are detected using a signal from an image sensing device such as a CCD. When the second stroke switch is pressed, main exposure is performed in accordance with the conditions that have been set. Thus, adjustment of focus and exposure can be performed by relying solely upon the image sensing device and without using various sensors. Moreover, processing is completed in a short period of time by the second stroke switch, which is pressed following the first stroke switch. As a result, focus and exposure adjustments can be carried out in a short period of time using solely an image sensing device without relying upon a rangefinder sensor and photometric sensor, and release time lag can be reduced.

3 Claims, 22 Drawing Sheets

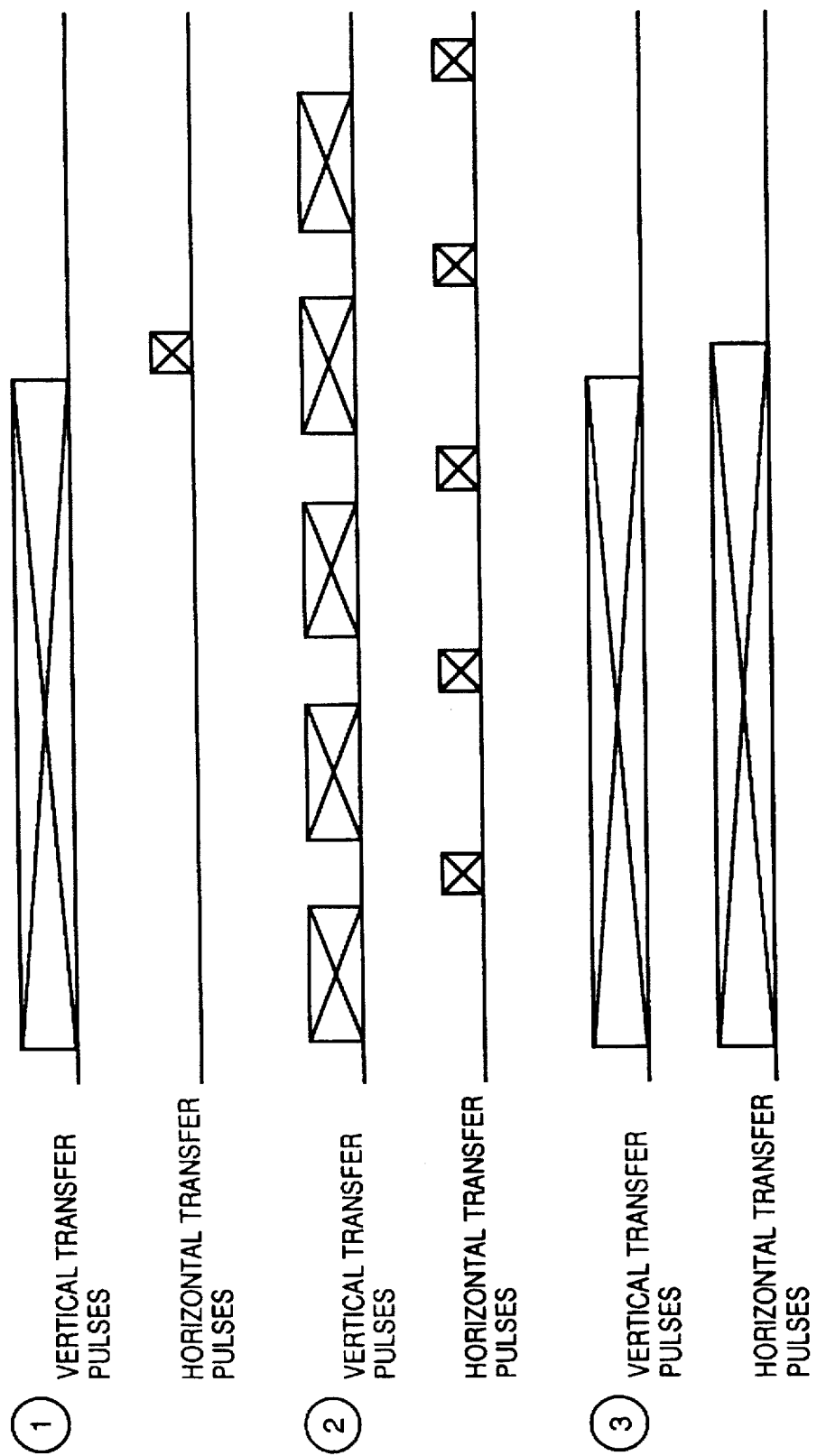

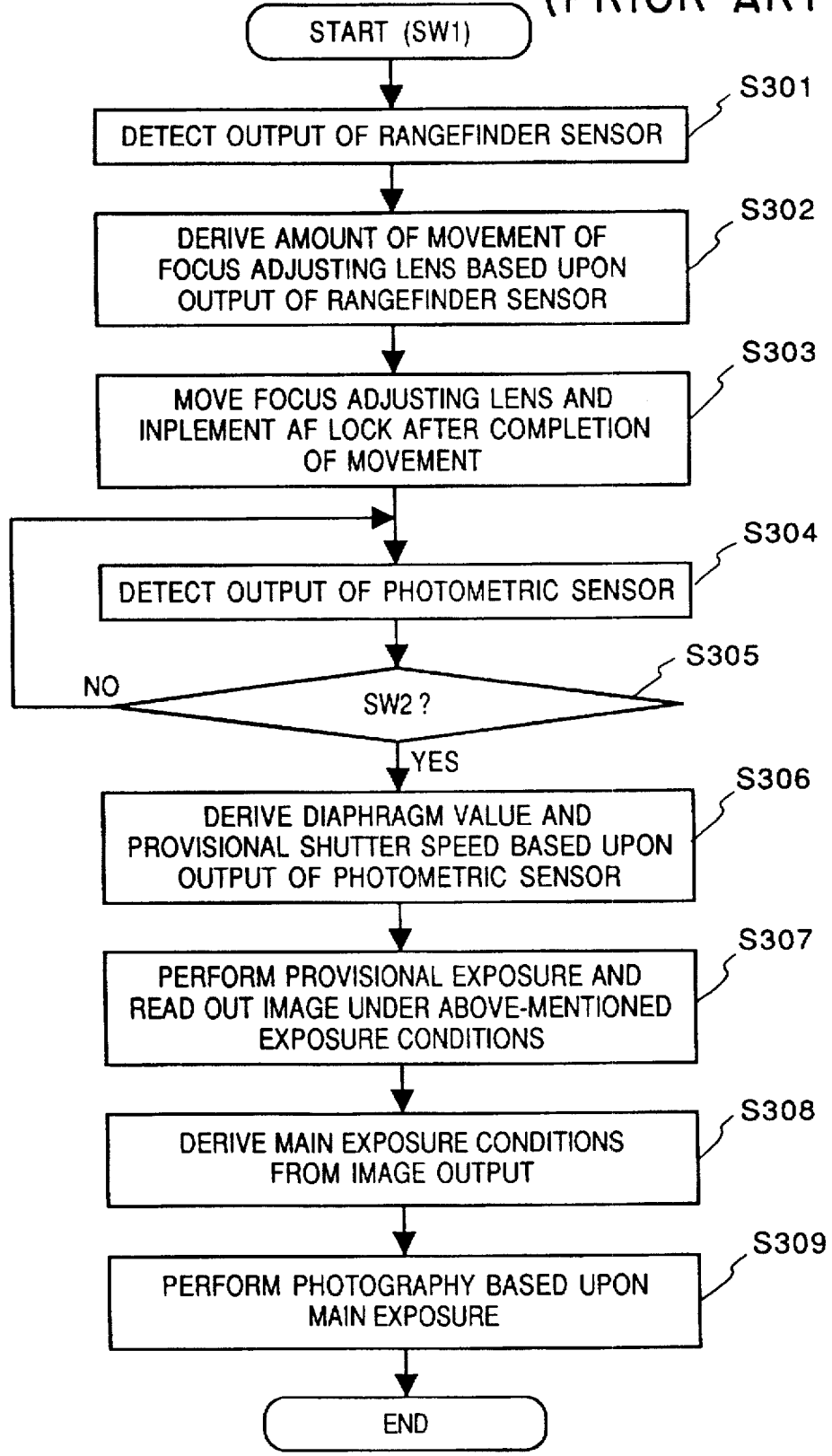

IMAGE SENSING APPARATUS AND METHOD WITH EXPOSURE PERFORMED BASED ON FOCUS EVALUATION VALUES

BACKGROUND OF THE INVENTION

1. Field of the Invention

This invention relates to an image sensing apparatus and method in which an image sensing device is used to convert an optical image into an electric signal.

2. Description of the Related Art

A digital electronic camera is known as one type of image sensing apparatus. FIG. 21 is a block diagram illustrating the construction of a digital electronic camera according to the prior art. Numeral 100a denotes the digital electronic camera, and number 101a represents a recording medium such as a memory card.

The digital electronic camera 100a includes an image sensing lens 1a the focal length and field angle of which are adjustable, a diaphragm/shutter 2a for performing both a diaphragm function and shutter function, a mechanical drive circuit 3a for driving the image sensing lens 1a and diaphragm/shutter 2a, and an image sensing device 4a for converting light reflected from a subject into an electric signal.

The digital electronic camera 100a further includes a timing-signal generating circuit (TG) 5a for generating a timing signal necessary for operating the image sensing device 4a, a drive circuit 6a for driving the image sensing device 4a by amplifying the signal from the timing-signal generating circuit 5a to a level at which the image sensing device 4a is capable of being driven, a preprocessing circuit 7a having a correlated double-sampling circuit (CDS circuit) for removing noise from the output of the image sensing device 4a as well as an automatic gain-control circuit (AGC circuit), an A/D converter 8a, and an image signal processing circuit 9a, which has a memory for temporarily storing a digital signal obtained by an A/D conversion, for processing the digital signal stored in the memory.

The digital electronic camera 10a further includes a system control CPU 10a, a console display unit 11a for presenting a display which assists in operating the camera and for displaying the status of the camera, a control console 12a having a release switch capable of two-stage operation so as to serve as a first stroke switch SW1 (a first release switch) and a second stroke switch SW2 (a second release switch) in order that a photographer may operate the camera to start photography, and a recording medium I/F 13a for connecting the digital electronic camera 100a and the recording medium 101a.

The timing-signal generating circuit 5a is connected to a rangefinder sensor 14a which measures the distance between the image sensing apparatus and a subject in order that the focal length of the image sensing lens 1a may be adjusted, and a photometric sensor 15a for measuring the brightness of the subject.

The operation of this conventional image sensing apparatus will now be described with reference to the flowchart of FIG. 22, which illustrates the image-sensing processing routine according to the prior art.

By pressing the first stroke switch SW1 on the console 12a to issue a photography-start command, the photographer initiates operation of the rangefinder sensor 14a so that the output of the sensor is applied to the system control CPU 10a (step S301). The latter calculates amount of movement of a focusing lens of the image sensing lens 1 based upon the output of the rangefinder sensor 13a (step S302), whereby a focused state is attained by moving the focusing lens of the image sensing lens 1 via the mechanical drive circuit 3a. When movement of the focusing lens is completed, an auto-focusing lock (AF LOCK) is implemented to lock the focusing lens against any further movement (step S303). The output of the rangefinder sensor 15a continues entering the system control CPU 10a until pressing of the second stroke switch SW2 is detected (step S304). When pressing of the second stroke switch SW2 has been detected (step S305), the CPU 10a senses the brightness of the subject from the output of the photometric sensor 15a and calculates a diaphragm aperture value and shutter speed commensurate with the sensed value based on a lookup table (step S306). The diaphragm aperture and the electronic shutter timing of the timing-signal generator are set based upon these calculated exposure conditions, the image sensing device 4a is exposed and the output of the device is read out (step S307). The read output of the image sensing device 4a is subjected to correlated__double-sampling (CDS) processing and signal processing such as gain control by the preprocessing circuit 7a. At this time the gain of the gain control circuit is decided by the sensitivity of the image sensing device and therefore is set when the image sensing apparatus is manufactured. The output of the preprocessing circuit 7a is converted to a digital signal by the A/D converter 8a, whence the digital signal enters the image signal processing circuit 9a. The exposure conditions are re-confirmed from the output of the image sensing device 4a by the image signal processing circuit 9a and system control CPU 10a (step S308), any error between these conditions and the proper exposure is sensed and the setting of the shutter speed is altered. The image sensing device 4a is exposed again based upon the altered exposure conditions and the output of device 4a is read again (step S309). The output of the image sensing device 4a is converted to a digital signal and the digital signal is then converted to a specific format by the image signal processing circuit 9a. The resulting image signal is then recorded on the recording medium 101 via the recording medium I/F 13a.

In the conventional digital electronic camera described above, various sensors other than the image sensing device 4a, such as the rangefinder sensor 14a and photometric sensor 15a, are used. This makes it difficult to reduce the size of the camera and to lower cost.

A technique which relies solely upon an image sensing device without employing various other sensors has been implemented in an apparatus such as a video camera recorder, in which the image sensing device is substituted for the sensors to perform their functions. However, a satisfactory performance cannot be obtained in the above-mentioned electronic camera for still pictures, in which it is required to minimize the shutter-release time lag from the moment the shutter is pressed to the moment the image is recorded.

SUMMARY OF THE INVENTION

Accordingly, an object of the present invention is to provide an image sensing apparatus in which focus and exposure adjustments can be carried out in a short period of time using solely an image sensing device without relying upon a rangefinder sensor and photometric sensor, and in which the release time lag can be reduced.

In accordance with the present invention, the image sensing apparatus converts an optical image to an electric signal by an image sensing device, detects a focal-point evaluation value, which indicates degree of focusing of the optical image, by focus evaluation-value detecting means using the image sensing device, performs focus adjustment, which is for focusing the optical image on the image sensing device, by focus adjusting means based upon the detected focus evaluation value, detects a proper amount of exposure by exposure-amount detecting means using the image sensing device, performs exposure adjustment by exposure adjusting means in accordance with the detected proper amount of exposure, designates start of focus adjustment and start of exposure adjustment by a first release switch, performs main exposure by main exposure image sensing means after the adjustments of focus and exposure, and designates start of main exposure by a second release switch. As a result, adjustments of focus and exposure can be carried out in a short time merely by an image sensing device without using a rangefinder sensor and photometric sensor, and release time lag can be reduced. This makes it possible to obtain a more compact apparatus and to lower cost.

In accordance with the image sensing apparatus of the present invention, the focus evaluation-value detecting means detects a first focus evaluation value upon opening the diaphragm, which limits the amount of exposing light impinging upon the image sensing device, in response to a command from the first release switch, detects a second focus evaluation value upon making aperture diameter of the diaphragm approximately the same as that at main exposure after the focus adjustment is performed by the focus adjusting means in accordance with the detected first focus evaluation value, detects a third focus evaluation value upon establishing a diaphragm state approximately the same as that at main exposure in response to a command from the second release switch, and the main exposure image sensing means compares the second and third focus evaluation values and performs main exposure when the difference between these values is less than a predetermined value. As a result, focus and exposure can be adjusted in a short period of time by accurate adjustment of the diaphragm (lens aperture).

In accordance with the image sensing apparatus of the present invention, the optimum amount of exposure is detected when the second and third focus evaluation values are detected. This makes possible detection in a shorter period of time.

In accordance with the image sensing apparatus of the present invention, when an auto-focus lock switch is not in an auto-focus mode, the focus evaluation-value detecting means detects a second focus evaluation value upon making aperture diameter of the diaphragm the same as that which prevails when main exposure is performed after the focus adjustment is carried out upon opening the diaphragm, which limits the amount of exposing light impinging upon the image sensing device, in response to a command from the first release switch, detects a third focus evaluation value in accordance with a diaphragm state approximately the same as that at main exposure in response to a command from the second release switch, and the main exposure image sensing means compares the second and third focus evaluation values and performs main exposure when the difference between these values is less than a predetermined value. When the autofocus lock switch is in the auto-focus mode, main exposure is performed as is without carrying out detection of the second and third focus evaluation values. As a result, the image sensing operation is omitted in dependence upon various conditions even in the auto-focus mode, thereby making it possible to adjust focus and exposure in a short period of time merely by an image sensing device.

In accordance with the image sensing apparatus of the present invention, time from detection of the focus evaluation value detected or from completion of the focus adjustment to pressing of the second release switch is measured by a timer, main exposure is performed when the measured time is less than a predetermined time and detection of the focus evaluation value or correction of exposure is performed again when the predetermined time elapses. As a result, by adding on an operation only in a case where a long standby time has been detected by the timer, release time lag at the time of photography can be shortened and power consumption can be reduced to prolong battery life.

In accordance with the image sensing apparatus of the present invention, time from completion of detection of the first or second focus evaluation value to issuance of a command from the second release switch is measured by a timer and, when the measured time is less than a predetermined time, main exposure is performed without performing subsequent focus adjustment. As a result, the image sensing operation is omitted in dependence upon various conditions, thereby making it possible to adjust focus and exposure in a short period of time merely by an image sensing device.

In accordance with the image sensing apparatus of the present invention, a power supply of an image sensing system which drives the image sensing device is turned off when the focus evaluation value is detected and is turned on again when the second release switch is pressed. This makes it possible to reduce power consumption and extend battery life.

In accordance with the image sensing apparatus of the present invention, the apparatus is provided with a timer for measuring time from detection of the focus evaluation value to pressing of the second release switch. When time measured by the timer is smaller than a predetermined value, main exposure is performed without turning off the power supply of the image sensing system. This conserves energy and improves response.

Further, the image sensing apparatus of the present invention derives a fourth focus evaluation value from the output of the image sensing device, which value prevails at the time of main exposure, by fourth focus evaluation-value deriving means, detects, by release-switch detecting means, that the first or second release switch is being pressed after completion of main exposure, and derives a fifth focus evaluation value by fifth focus evaluation value deriving means when it has been detected by the release-switch detecting means that the first or second release switch is being pressed. Main exposure is performed immediately when the difference between the fourth and fifth focus evaluation values is less than a predetermined value and the second release switch has already been pressed. When the difference between the fourth and fifth focus evaluation values is less than a predetermined value and the second release switch has not been pressed, pressing of the second release switch is awaited. When the above-mentioned difference surpasses the predetermined value, the diaphragm is opened again and the focus adjustment which prevailed when the first release switch was pressed is performed. This makes it possible to perform image sensing that accommodates a change in conditions.

Further, the image sensing apparatus of the present invention derives a fourth focus evaluation value from the output of the image sensing device, which value prevails at the time of main exposure, by fourth focus evaluation value deriving means, and detects, by release-switch detecting means, that the first or second release switch is being pressed after completion of main exposure, measures time from completion of main exposure to pressing of the second release switch by a timer. When the time measured by the timer is shorter than a predetermined time, photography under main exposure is carried out as is. When the time measured by the timer is longer than the predetermined time, a fifth focus evaluation value is detected and the difference between the fourth and fifth focus evaluation values is derived. When the difference between the fourth and fifth focus evaluation values is less than a predetermined value, the timer is reset and the above-described operation is repeated until the second release switch is pressed again. When the difference surpasses the predetermined value, the diaphragm is opened again and the focus adjustment which prevailed when the first release switch was pressed is performed. This makes it possible to deal with a change in conditions while conserving power.

In accordance with the present invention, the image sensing method comprises the steps of designating start by a first release switch, converting an optical image to an electric signal by an image sensing device, detecting a focus evaluation value that indicates degree of focusing of the optical image, performing focus adjustment, which is for focusing the optical image on the image sensing device, based upon the detected focus evaluation value detecting a proper amount of exposure of the image sensing device using an output from the image sensing device, performing exposure adjustment in accordance with the detected proper amount of exposure, and performing main exposure, after the adjustments of focus and exposure, by a second release switch. As a result, adjustments of focus and exposure can be carried out in a short time merely by an image sensing device.

In accordance with the present invention, the image sensing apparatus converts an optical image to an electric signal by an image sensing device, detects a rangefinding signal by rangefinding-signal detecting means using an image sensing device, performs focus adjustment, which is for focusing the optical image on the image sensing device, by focus adjusting means based upon the detected rangefinding signal, detects a proper amount of exposure by exposure detecting means using the image sensing device, performs exposure adjustment by exposure adjusting means in accordance with the detected proper amount of exposure, and performs main exposure by main exposure image sensing means after preparatory photographic processing is executed by performing the focus adjustment and exposure adjustment. In the main exposure, photographic conditions different from those of the preparatory photographic processing are set by photographic-condition modifying means. As a result, adjustments of focus and exposure can be carried out in a short time merely by an image sensing device without using a rangefinder sensor and photometric sensor, and release time lag can be reduced. This makes it possible to obtain a more compact apparatus and to lower cost.

In accordance with the image sensing apparatus of the present invention, the exposure adjustment is performed in accordance with the detected proper amount of exposure before the rangefinding signal is detected in the image sensing apparatus. This makes it possible to detect a rangefinding signal having the proper amount of exposure.

In accordance with the image sensing apparatus of the present invention, color and flicker of a light source illuminating a subject are detected by light-source detecting means in the preparatory photographic processing. As a result, the light source can be detected and the color reproducibility thereof corrected in the course of image signal processing.

In addition, this can be used in detecting that the light source illuminating the subject has been changed in the course of focal adjustment.

In accordance with the image sensing apparatus of the present invention, driving is performed in the preparatory photographic processing in such a manner that a drive period in which a signal representing a single screen is outputted from the image sensing device becomes shorter than that which prevails at the time of main exposure. This makes it possible to execute the preparatory photographic processing is a short time, thus curtailing the release time lag.

In accordance with the image sensing apparatus of the present invention, the photographic-condition modifying means sets at least one of sensitivity, amount of exposure and signal processing gain of the image sensing device to different photographic conditions. This makes it possible to establish settings in such a manner that processing time is shortened in preparatory photographic processing and a proper amount of exposure is obtained in main exposure, whereby focus and exposure can be adjusted in a short time by relying solely upon an image sensing device.

In accordance with the image sensing apparatus of the present invention, readout of an output from the image sensing device at the time of the exposure adjustment is performed at a speed higher than that at the time of main exposure. As a result, a quick exposure adjustment can be carried out in conformity with the prevailing conditions.

In accordance with the image sensing apparatus of the present invention, the image sensing device is an interline-type CCD and, in order to output a signal of one screen, performs at least one vertical transfer during transfer or cessation of transfer in a horizontal transfer portion, and accumulates or integrates at least some pixel charge of a vertical transfer register in a horizontal transfer register. By thus accumulating or integrating at least some of the pixel charge of a vertical transfer register in a horizontal transfer register, processing such as exposure adjustment can be simplified.

In accordance with the image sensing apparatus of the present invention, only an image signal corresponding to part of the area of the image sensing device is read out when the rangefinding signal is detected. Processing can be speeded up as a result.

In accordance with the image sensing apparatus of the present invention, an output area of the image sensing device is changed when the rangefinding signal cannot be detected from the image signal of part of the area of the image sensing device. This makes it possible to match a frame, which is for designating the scope or rangefinding, with an actual signal range.

In accordance with the image sensing apparatus of the present invention, a readout period at which an image signal representing a single screen from the image sensing device is read out is set in the preparatory photographic processing so as not to coincide with a commercial power-supply period or a multiple of one-half this period. As a result, flicker components of a fluorescent lamp or the like can be detected at 100 Hz or 120 Hz.

In accordance with the image sensing apparatus of the present invention, flicker components of a light source are detected on the basis of an image signal read out in accordance with the above-mentioned readout period. As a result, a change in the light source can be recognized at the moments the flicker components change.

In accordance with the image sensing apparatus of the present invention, when there is a change in the detected state of flicker during the course of preparatory photographic processing, some of the photographic conditions which prevailed prior to the change are invalidated. As a result, a correction adaptable to various conditions can be performed by not using the photographic conditions that were in effect before the above-mentioned change.

In accordance with the image sensing apparatus of the present invention, a photographic condition invalidated is white balance. This makes it possible to perform a white-balance correction that is adaptable to various conditions.

In accordance with the image sensing apparatus of the present invention, when the image signal is read out of the image sensing device the first time in the exposure adjustment, the amount of exposure of the image sensing device is set to be less than a predetermined value and gain of an amplifier which amplifies the image signal is set to be less than a predetermined value. This makes it possible to prevent saturation of the image sensing device.

In accordance with the image sensing apparatus of the present invention, the apparatus has at least one of a diaphragm for limiting amount of light on the image sensing device and a shutter capable of controlling exposure time of the image sensing device, wherein at least one of the diaphragm aperture and shutter speed is controlled at the time of the exposure adjustment, thereby making the amount of exposure of the image sensing device less than that at the time of main exposure. As a result, the diaphragm (lens aperture) and shutter speed can be controlled in dependence upon width of photometryrange.

In accordance with the image sensing apparatus of the present invention, the image sensing device is an interline-type CCD, wherein readout of a vertical transfer portion from the CCD is performed every other pixel at the time of the exposure adjustment. This makes it possible to prevent the vertical transfer portion from becoming saturated with image-capture charge.

In accordance with the image sensing apparatus of the present invention, the image sensing device is a CCD and, in the preparatory photographic processing interval, the setting of at least one of a substrate level for setting a substrate potential of the image sensing device and an amplitude of a transfer pulse is different from that at the time of main exposure. This makes it possible to set a large dynamic range for the image sensing device and to broaden the width of the photometryrange.

In accordance with the image sensing apparatus of the present invention, at the time of the exposure adjustment, the set level of the substrate is made a voltage less than that at the time of main exposure. As a result, the level of the image signal read out at the time of exposure adjustment and the level of the image signal read out at the time of main exposure can be made uniform.

In accordance with the image sensing apparatus of the present invention, at the time of the exposure adjustment, this adjustment is corrected by a corrective value conforming to a change in sensitivity due to alteration of the substrate. As a result, the range of photometry range can be widened without using an infrared cut-off filter.

In accordance with the image sensing apparatus of the present invention, the voltage of the substrate is set to be low when the rangefinding signal is detected. As a result, a pattern of infrared light or of visible light in the proximity of infrared can be projected upon a subject for the purpose of rangefinding.

In accordance with the image sensing apparatus of the present invention, the apparatus is provided with a projecting device for projecting an infrared- or visible-light pattern for rangefinding. When the rangefinding signal is detected, infrared light or visible light from the projecting device is projected upon the subject and the focus adjustment is performed on the basis of reflected light from the subject. As a result, infrared sensitivity is raised to make focus adjustment possible even in a dark location.

In accordance with the image sensing apparatus of the present invention, the setting of the substrate or of the transfer pulses is changed only when the subject is darker than a predetermined level. As a result, infrared sensitivity is raised to make focus adjustment possible even in a dark location.

In accordance with the image sensing apparatus of the present invention, amplification factor of the image signal is lowered in the preparatory photographic processing. This makes it possible to prevent saturation of the image signal.

In accordance with the image sensing apparatus of the present invention, when the image signal of the image sensing device is subjected to signal processing, at least part of the processing for deriving the photometric signal or rangefinding signal is executed by an image signal processing circuit using hardware and at least part of this signal processing is executed by an image signal processor using software. The preparatory photographic processing in the above-mentioned signal processing is executed in accordance with the image signal processing circuit. As a result, processing can be executed in a shorter period of time in comparison with the case in which signal processing is executed by a program. This makes it possible to shorten release time lag at the time of photography.

In accordance with the present invention, the image sensing method comprises the steps of converting an optical image to an electric signal by an image sensing device, detecting a rangefinding signal using the image sensing device, performing focus adjustment in accordance with the detected proper amount of exposure, and performing main exposure after preparatory photographic processing is executed by performing the focus adjustment and exposure adjustment. In the main exposure, photographic conditions different from those of the preparatory photographic processing are set. As a result, adjustments of focus and exposure can be carried out in a short time merely by an image sensing device without using a rangefinder sensor and photometric sensor, and release time lag can be reduced. This makes it possible to obtain a more compact apparatus and to lower cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is an explanatory view illustrating vertical transfer and horizontal transfer;

FIG. 22 is a flowchart illustrating a processing routine for image sensing according to the prior art.

DESCRIPTION OF THE PREFERRED EMBODIMENTS

Embodiments of an image sensing apparatus and method according to the present invention will now be described in accordance with the accompanying drawings. Though the image sensing apparatus of the embodiments is applied to a digital camera, this does not impose a limitation upon the present invention.

First Embodiment

Figure 1:
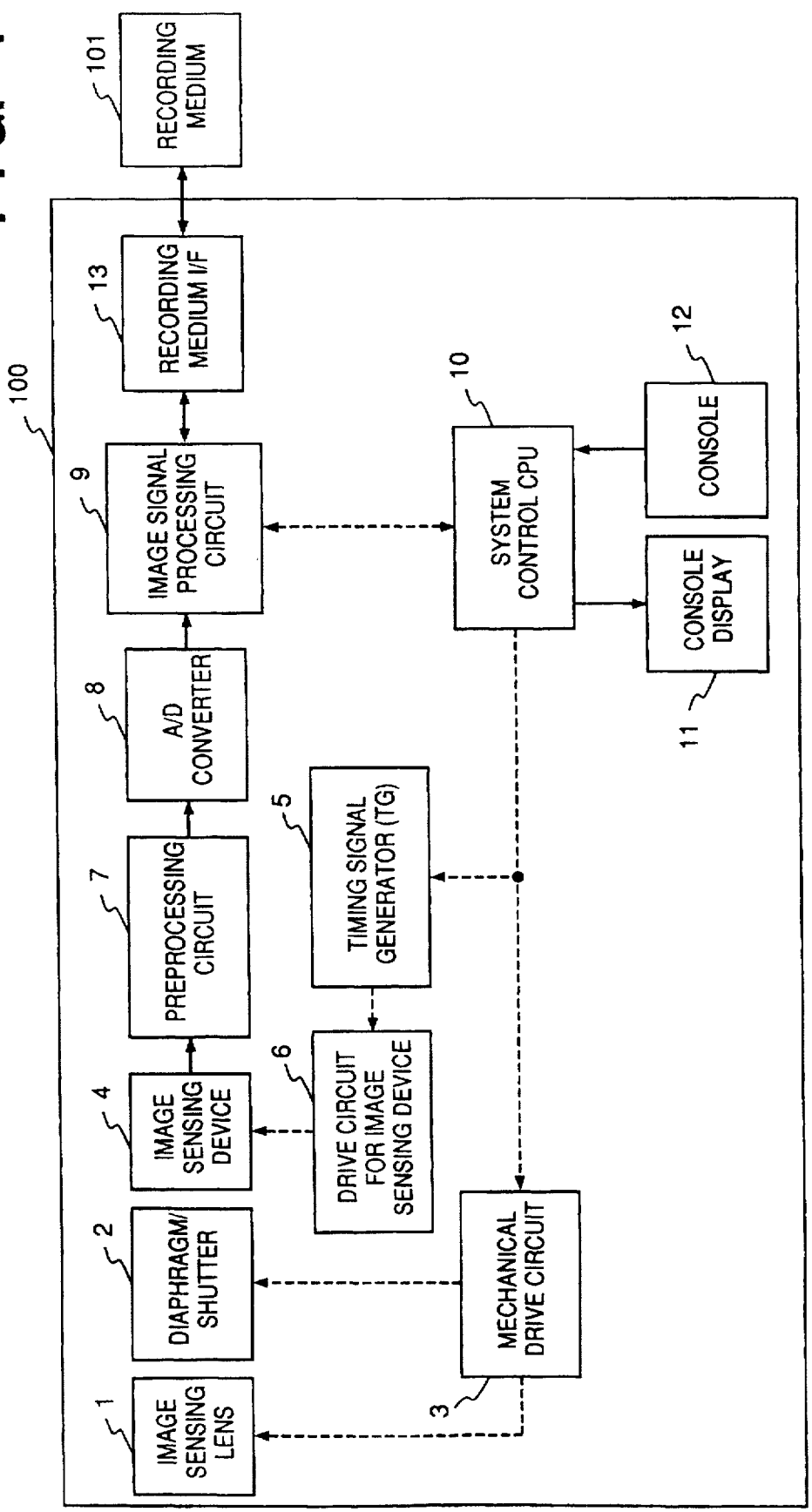
FIG. 1 is a block diagram showing the construction of a digital camera according to a first embodiment of the present invention.

FIG. 1 is a block diagram illustrating the construction of a digital electronic camera 100 according to a first embodiment of the invention. The camera 100 uses a recording medium 101 such as a memory card.

The digital electronic camera 100 includes an image sensing lens 1 the focal length and field angle of which are adjustable, a diaphragm/shutter 2 for performing both a diaphragm function and shutter function, a mechanical drive circuit 3 for driving the image sensing lens 1 and diaphragm/ shutter 2, and an image sensing device 4 for converting light reflected from a subject into an electric signal.

The digital electronic camera 100 further includes a timing-signal generating circuit (TG) 5 for generating a timing signal necessary for operating the image sensing device 4, a drive circuit 6 for driving the image sensing device 4 by amplifying the signal from the timing-signal generating circuit 5 to a level at which the image sensing device 4 is capable of being driven, a preprocessing circuit 7 having a correlated double-sampling circuit (CDS circuit) for removing noise from the output of the image sensing device 4 as well as an automatic gain-control circuit (AGC circuit), an A/D converter 8, and an image signal processing circuit 9, which has a memory for temporarily storing a digital signal obtained by an A/D conversion, for processing the digital signal stored in the memory.

The digital electronic camera 100 further includes a system control CPU 10, a console display unit 11 for presenting a display which assists in operating the camera and for displaying the status of the camera, a control console 12 having a switch capable of two-stage operation so as to serve as a first stroke switch SW1 and a second stroke switch SW2 in order that a photographer may operate the camera to start photography, and a recording medium I/F 13 for connecting the digital electronic camera 100 and the recording medium 101.

The operation of the digital electronic camera constructed as set forth above will now be described with reference to the flowchart of FIG. 2, which illustrates an image-sensing processing routine according to the present invention.

In response to operation of the first stroke switch SW1 on the console 12, the system control CPU 10 initiates photography. First, the system control CPU 10 starts coarse adjustment of exposure (step S2).

Figure 3:
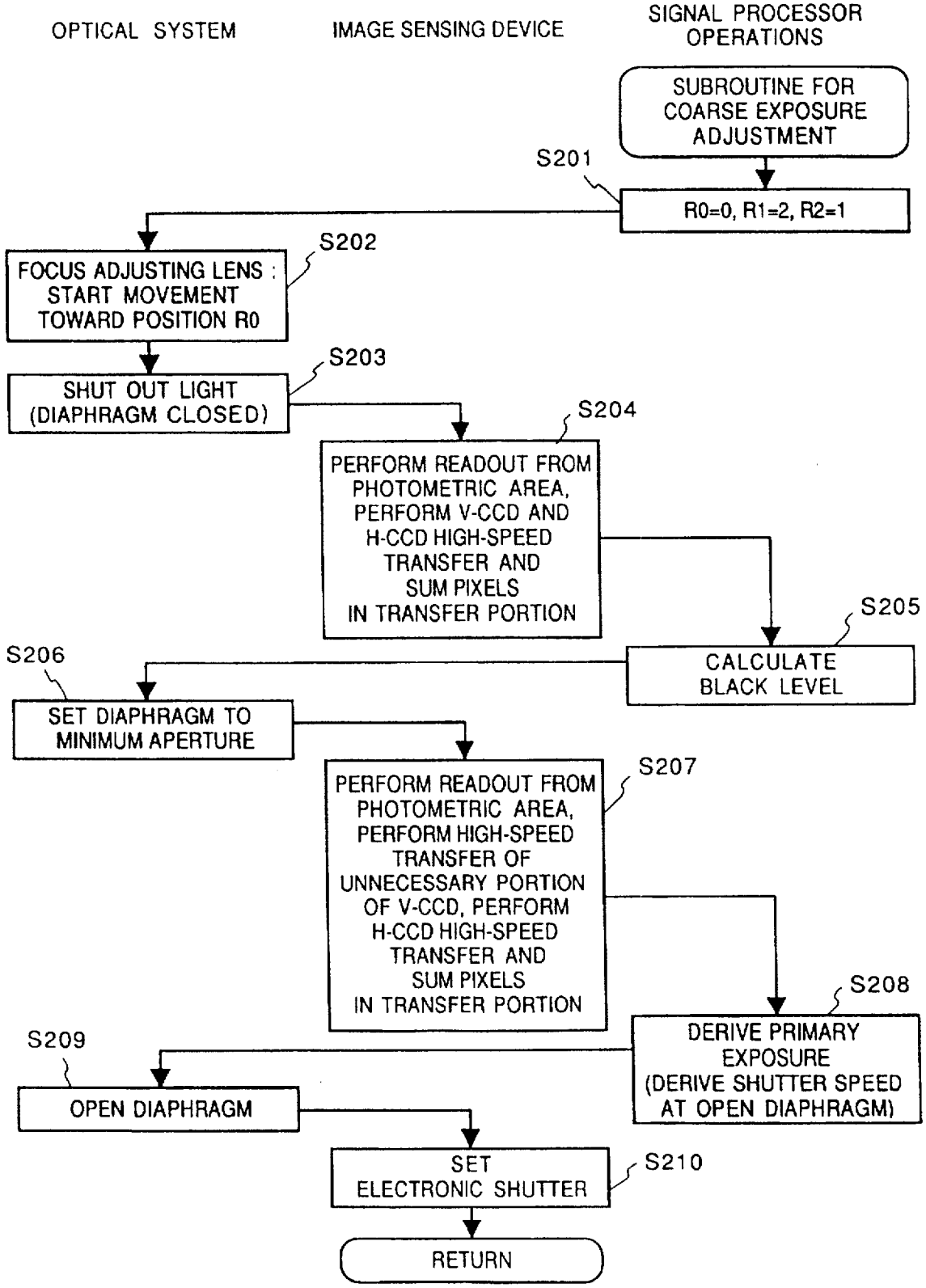
FIG. 3 is a flowchart illustrating a subroutine for image sensing for coarse adjustment of exposure.
Figure 13:
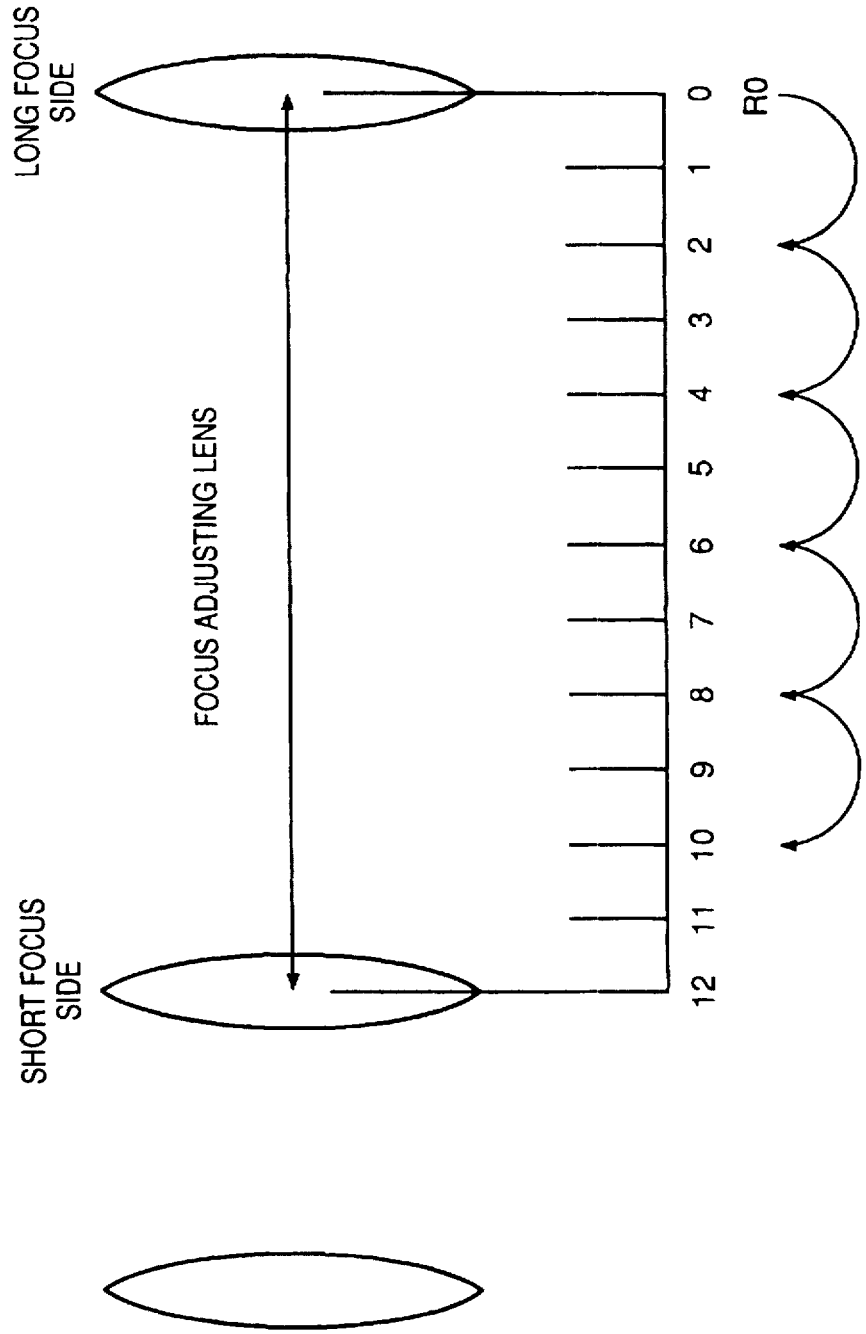
FIG. 13 is an explanatory view representing lens position of a focus adjusting lens.

FIG. 3 is a flowchart showing a subroutine for coarse adjustment of exposure. According to this subroutine, the system control CPU 10 sets initial values (R0=0, R1=2, R2=1) for designating the position of a focus adjusting lens (step S201 in FIG. 3). FIG. 13 is an explanatory view representing the lens position of the focus adjusting lens. Positions 0, 1, 2, 3 ... are the positions which the focus adjusting lens can occupy. Position 0 represents the maximum focal length and position 12 the minimum focal length.

Next, processing shifts to control of the optical system to move the focus adjusting lens to R1 (the initial value of 0, namely the position of maximum focal length) (step S202). The diaphragm is then closed to shut out light (step S203). In order to obtain a reference value for photometry, the output of the image sensing device when the diaphragm is in the shut state is read out (step S204). In order to raise the speed of readout at this time, each of the vertical and horizontal transfer portions is driven at a speed higher than that which prevails at ordinary video-signal extraction. For example, in a case where the image sensing device is an interline CCD having an effective pixel count of approximately 440,000 in which vertical transfer is implemented at about 15 KHz and horizontal transfer at about 14 KHz at the time of an ordinary readout operation, it is possible to read out all pixels of the image sensing device within 1 ms by implementing vertical transfer at 1 MHz and horizontal transfer at 28 MHz. Thus, the value of the black level, which serves as a reference, is derived on the basis of the signal that has been read out (step S205).

There are several specific approaches to achieve this high-speed transfer in terms of the relationship between vertical transfer and horizontal transfer. FIG. 11 is an explanatory view illustrating horizontal transfer and vertical transfer. At ① in FIG. 11, the frequency of vertical transfer pulses is made 1 MHz, all vertical lines are read out and the electric charge of all pixels is accumulated in a horizontal transfer register. After the transfer of all of the electric charge, the charge in the horizontal transfer register is transferred by a horizontal transfer pulse and outputted via an output amplifier.

At this time, the signal charges of respective pixels mix within the horizontal transfer register. However, since the setting of the amount of exposure of the image sensing device to a level at which focus adjustable is possible is the purpose of this coarse adjustment, no problems are encountered because it is eventually necessary to subject all pixel signals to integration processing. The signal thus outputted after the horizontal transfer enters the image signal processing circuit 9 via the preprocessing circuit 7 and A/D converter 8. The output signal which has entered the image signal processing circuit 9 is integrated over a period of time equivalent to the duration of horizontal transfer, and the output of the processing circuit 9 enters the signal-processing control CPU 10 as a detected value of black level for the purpose of implementing coarse adjustment of exposure.

In ② of FIG. 11, vertical transfer is divided up into five transfers and the signal that has accumulated in the horizontal transfer register is transferred horizontally and outputted after each vertical transfer. In this case, the amount of electric charge that accumulates in the horizontal transfer register is one-fifth that in the case of ①. Consequently, there is less risk of the horizontal transfer register overflowing. Further, it is possible to accumulate a signal in only an area for extracting an AF photometric signal by selecting some of above five transfers. As a result, an amount of the exposure in the area for extracting an AF photometric signal can be the most suitable primarily.

In ③ of FIG. 11, vertical transfer at a frequency of 1 MHz is performed for all vertical pixels in continuous fashion and, and the same time, horizontal transfer is carried out at a 28 MHz. However, in order to read out all of the pixels to the last, the horizontal transfer pulse is extended by an amount equivalent to one horizontal transfer. In the case of this method of drive, the mixing of pixels occurs not only in the vertical direction but also in the horizontal direction. However, because of the purpose of the principal operation, problems do not arise for the same reasons as set forth in connection with ① above.

As mentioned above, the image signal read out at step S204 is integrated over all pixels in the image signal processing circuit 9 via the preprocessing circuit 7 and A/D converter 8. The gain of the preprocessing circuit 7 is set, at the time of manufacture, in dependence upon the sensitivity of the image sensing device 4. After the black level is derived at step S205 in accordance with an operation within the CPU on the basis of the integrated signal, the CPU controls the optical system in such a manner that the diaphragm aperture of the diaphragm/shutter 2 is made as small as setting allows (step 206). Exposure is performed at this minimum lens aperture and at an electronic shutter speed that is as high as setting allows, and the image sensing device is driven in the same manner as at detection of the black level, described above (step S207). The image output read out is integrated over all or selected pixels in the image signal processing circuit 9 via the preprocessing circuit 7 and A/D converter 8.

The gain of the preprocessing circuit 7 also is set, at the time of manufacture, in dependence upon the sensitivity of the image sensing device 4. Furthermore, the brightness of outside light is detected by calculating the difference between the exposure output data, which has been integrated by the system control CPU 10, and the integrated black-level data, and the amount of exposure which prevails when focus adjustment is carried out is decided. Since exposure is performed by opening the diaphragm at the time of the focus adjustment, shutter speed for when the diaphragm is open is derived (step 208). Next, the diaphragm is opened under control of the optical system (step S209), the electronic shutter of the image sensing device 4 is set to the derived shutter speed (step S210), this subroutine is terminated and the program returns to the main routine.

Figure 2:
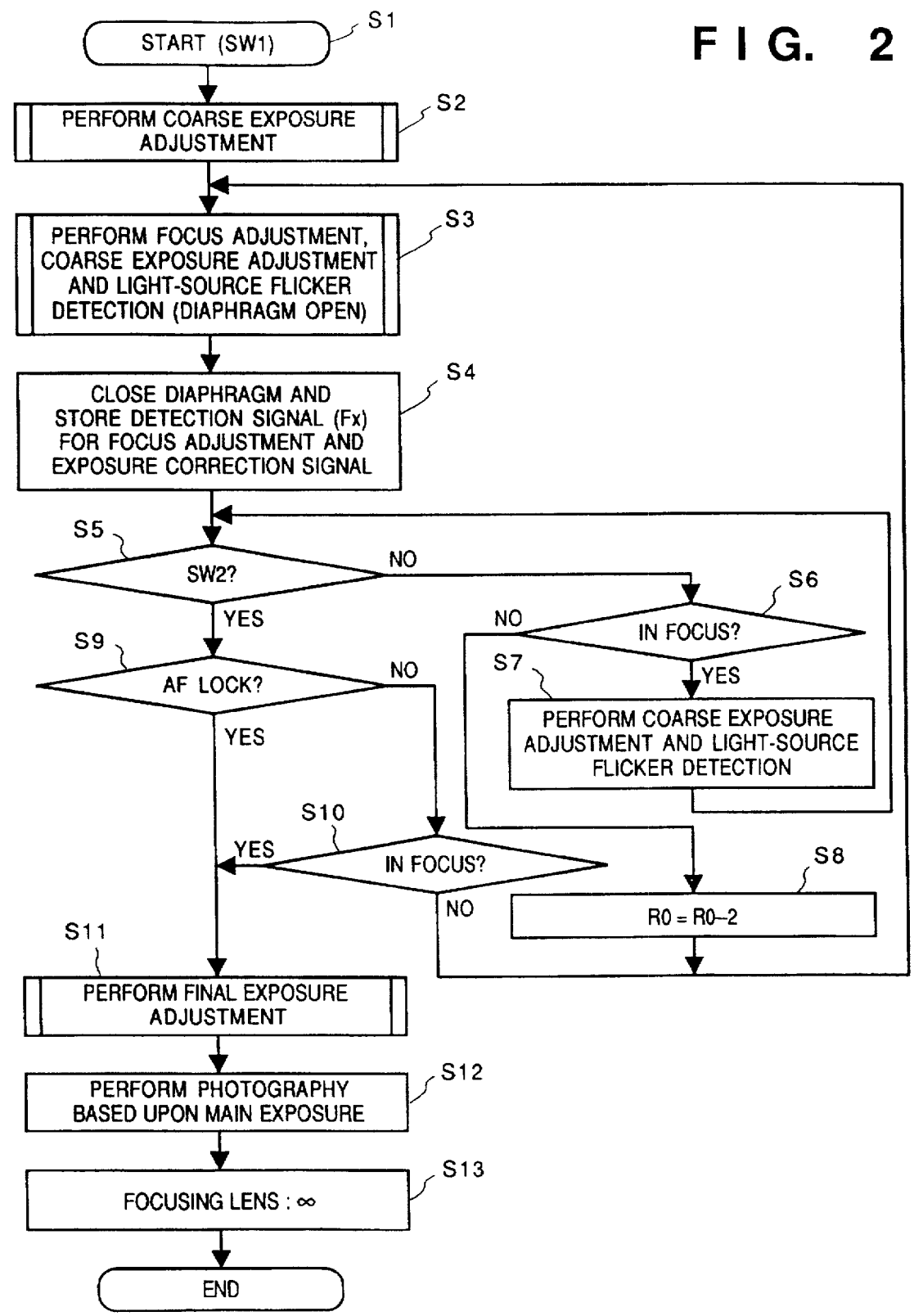
FIG. 2 is a flowchart illustrating a processing routine for image sensing.

Next, at step S3 in FIG. 2, focus adjustment, coarse adjustment of exposure and detection of light-source flicker are executed. FIGS. 4 through 7 are connected flowcharts illustrating a subroutine for focus adjustment, fine adjustment of exposure and detection of light-source flicker. First, it is verified whether movement of the focus adjusting lens commanded by coarse adjustment of exposure has been completed (step S211). If movement has not been completed, the apparatus waits until it has. When movement has been completed, exposure is performed by the electronic shutter solely for the set exposure time and the output of the image sensing device 4 is read out (step S212).

Figure 10:
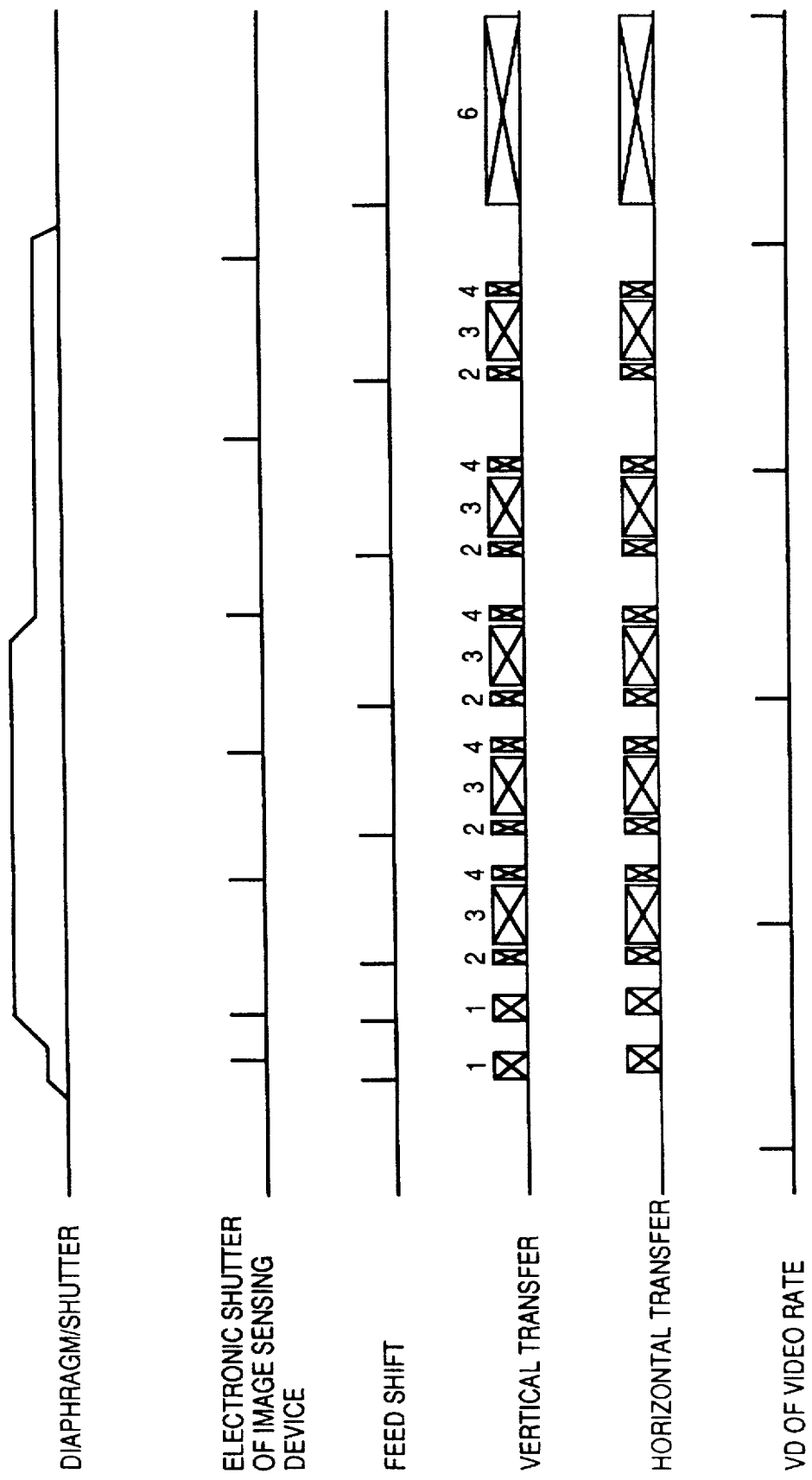
FIG. 10 is an explanatory view illustrating vertical transfer pulses and horizontal transfer pulses.
Figure 12A:
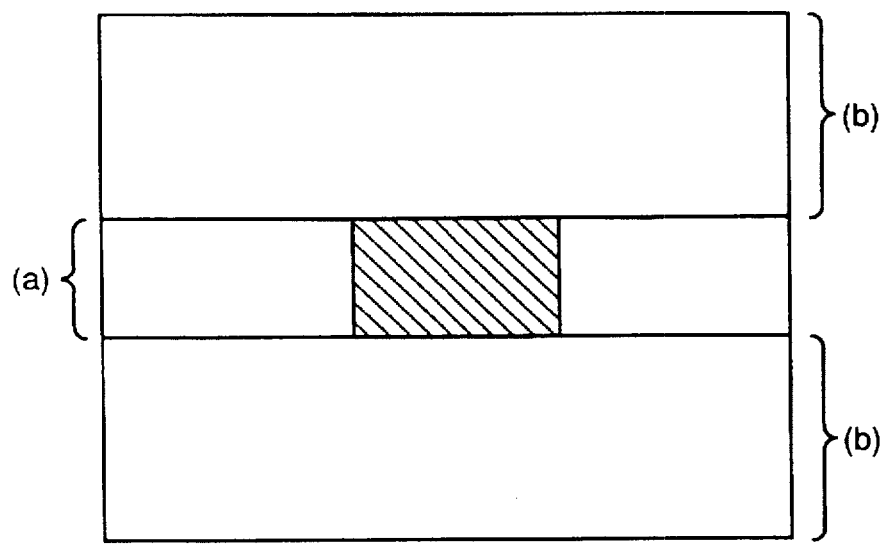
FIGS. 12A and FIG. 12B are explanatory views illustrating the ranges of pixels over which readout is performed.
Figure 12B:
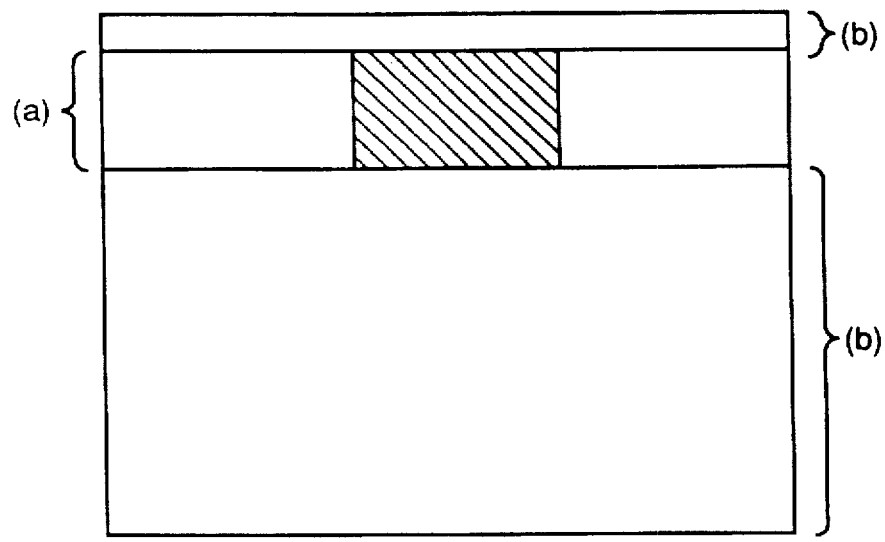

FIGS. 12A and FIG. 12B are explanatory views illustrating the ranges of pixels over which readout is performed. When an output is read out of the image sensing device 4, ordinary readout is performed with regard to pixels in a central portion (a) and high-speed readout is performed with regard to pixels in portions (b) above and below the central portion (a), as illustrated in FIG. 12A. More specifically, vertical transfer pulses and horizontal transfer pulses are read out by high-speed transfer states ②, ④ and an ordinary transfer state ③, as shown in FIG. 10. The signal read out enters the image signal processing circuit 9 via the preprocessing circuit 7 and A/D converter 8, and the preprocessing circuit 9 derives a rangefinding signal F0, which is an evaluation signal for judging the degree of focusing of the optical system, and a photometric signal L0, which is a luminance-level detection signal for correcting exposure (step S213). For example, the rangefinding signal F0, corresponding to a contrast signal, is derived by high-pass filtering (HPF) the image signal in shaded area of FIG. 12A, and the photometric signal L0, corresponding to an average of brightness, is derived by integrating the image signal in shaded area. In a case where a frame, which is displayed in a viewfinder or the like, for designating the scope of rangefinding is indicated by a zone of the kind shown in FIG. 12A, the mid-portion (shaded in FIG. 12A) of the signal read out in ordinary fashion from the portion (a) of the image sensing device 4 is extracted by a line memory or the like (not shown) located within the image signal processing circuit 9, and a focus adjustment is implemented using solely the extracted signal. This makes it possible to match the designating frame and the zone of the actually extracted signal.

Next, the amount of exposure and the shutter speed at the time of next exposure are derived by the system control CPU 10 from the photometric signal L0 (step S213). Note that the relation between the photometric signal and the amount of exposure or the shutter speed is already known and stored as a function or a table. It is determined whether the rangefinding signal F0 is greater than a predetermined value $\underline{a}$ (step S214). In a case where F0 is equal to or less than the predetermined value a, the rangefinding area for readout from the image sensing element 4 is changed (step S215).

This change can be implemented by setting the area (a), in which ordinary readout is performed, at the upper portion of the image sensing element 4, as shown in FIG. 12B, and altering drive of the image sensing element 4 in such a manner that readout is performed at a high speed in the other portions (b). When an edge signal still is not detected from the rangefinding area through method, the area for ordinary readout is set at the lower portion of the image sensing element 4 to detect the rangefinding signal.

It should be noted that an arrangement may be adopted in which the sequence of operations is the opposite of that mentioned above. That is, first ordinary readout may be performed from the lower portion of the image sensing element 4. If an edge signal is not detected in the signal from the lower portion of the image sensing element 4, then the signal from the upper portion of the image sensing element 4 is read out.

Figure 4:
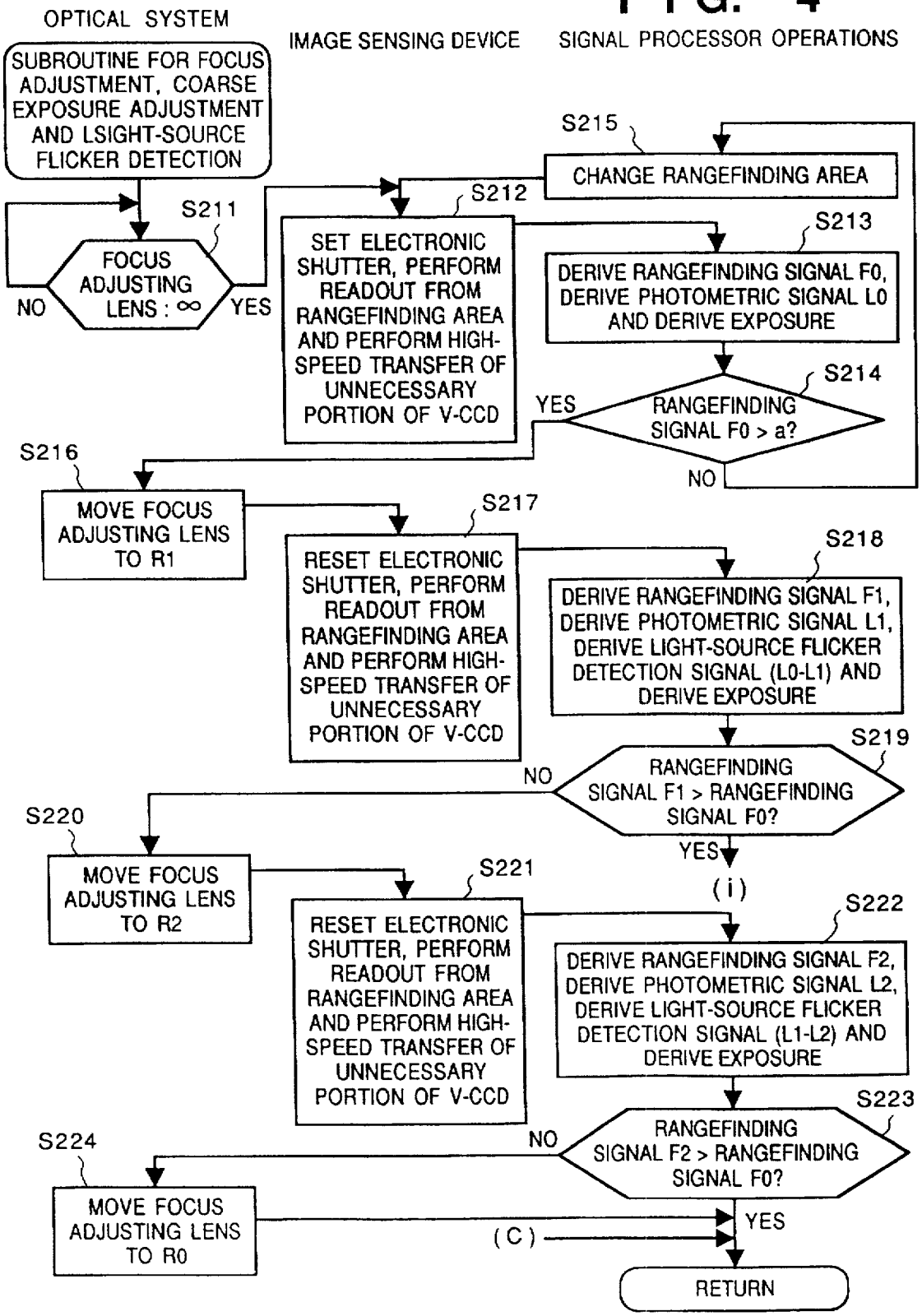
FIG. 4 is a flowchart illustrating a subroutine for focus adjustment, fine adjustment of exposure and detection of light-source flicker.
Figure 5:
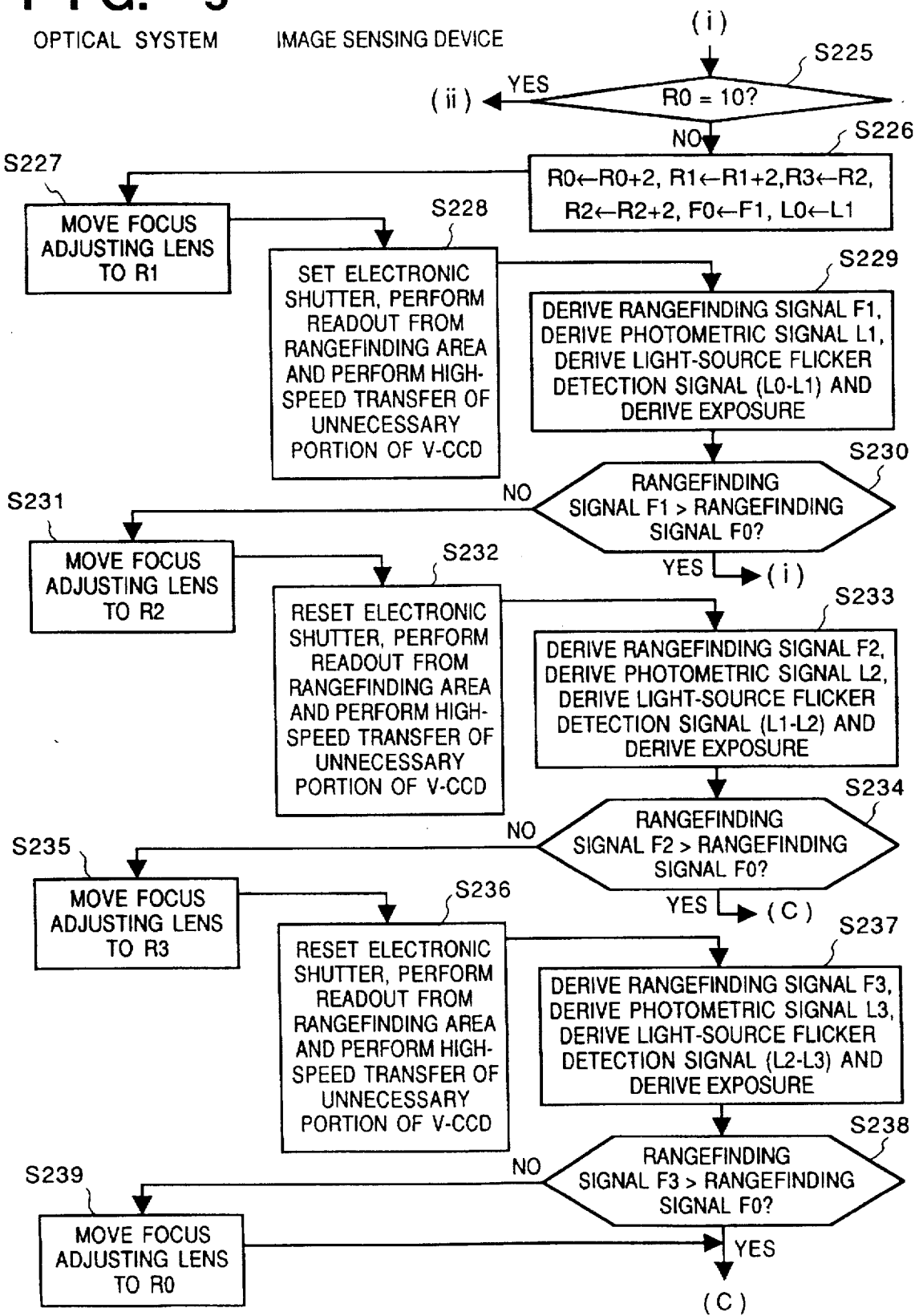
FIG. 5 is a flowchart, which is a continuation of FIG. 4, illustrating a subroutine for focus adjustment, fine adjustment of exposure and detection of light-source flicker.
Figure 6:
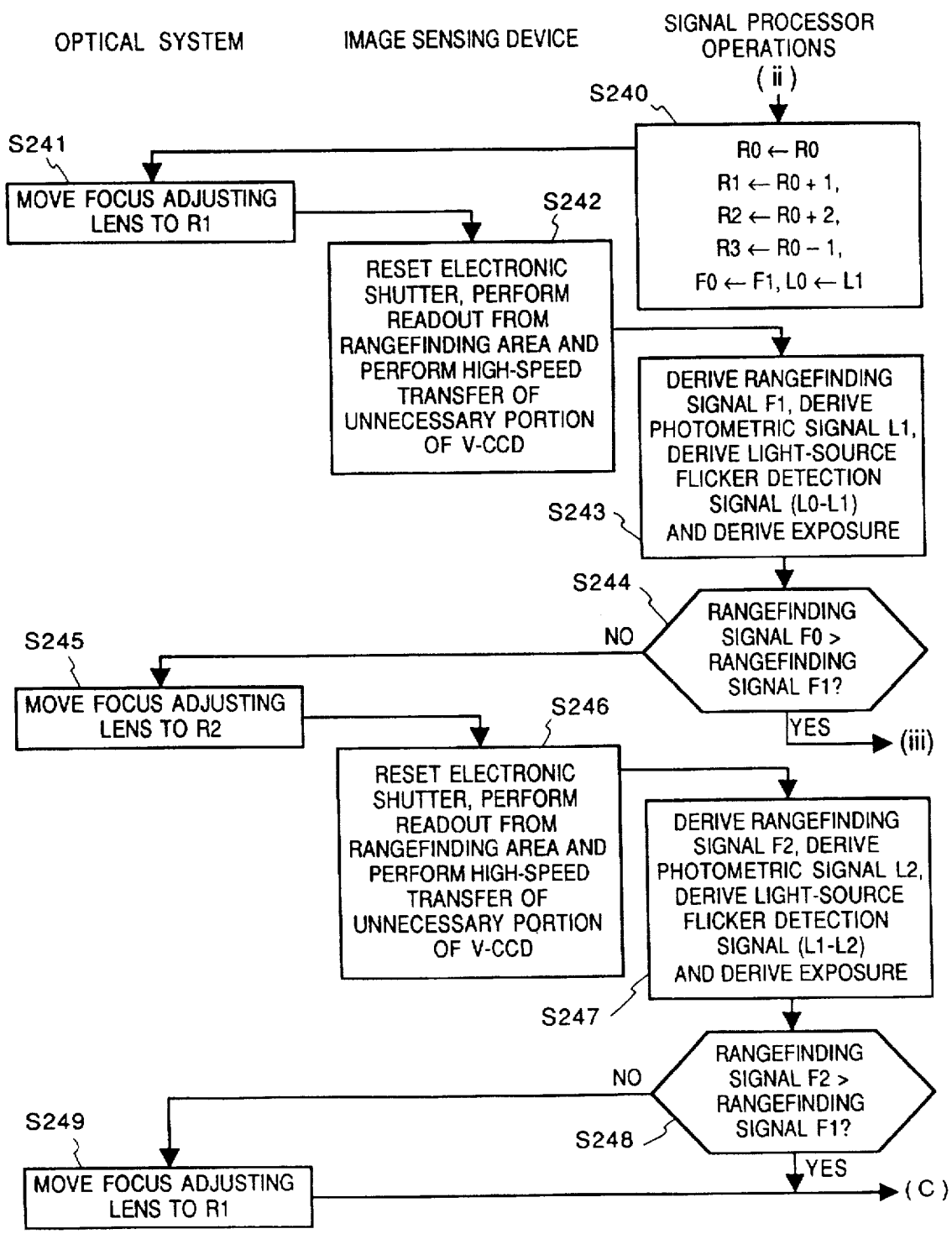
FIG. 6 is a flowchart, which is a continuation of FIG. 5, illustrating a subroutine for focus adjustment, fine adjustment of exposure and detection of light-source flicker.
Figure 7:
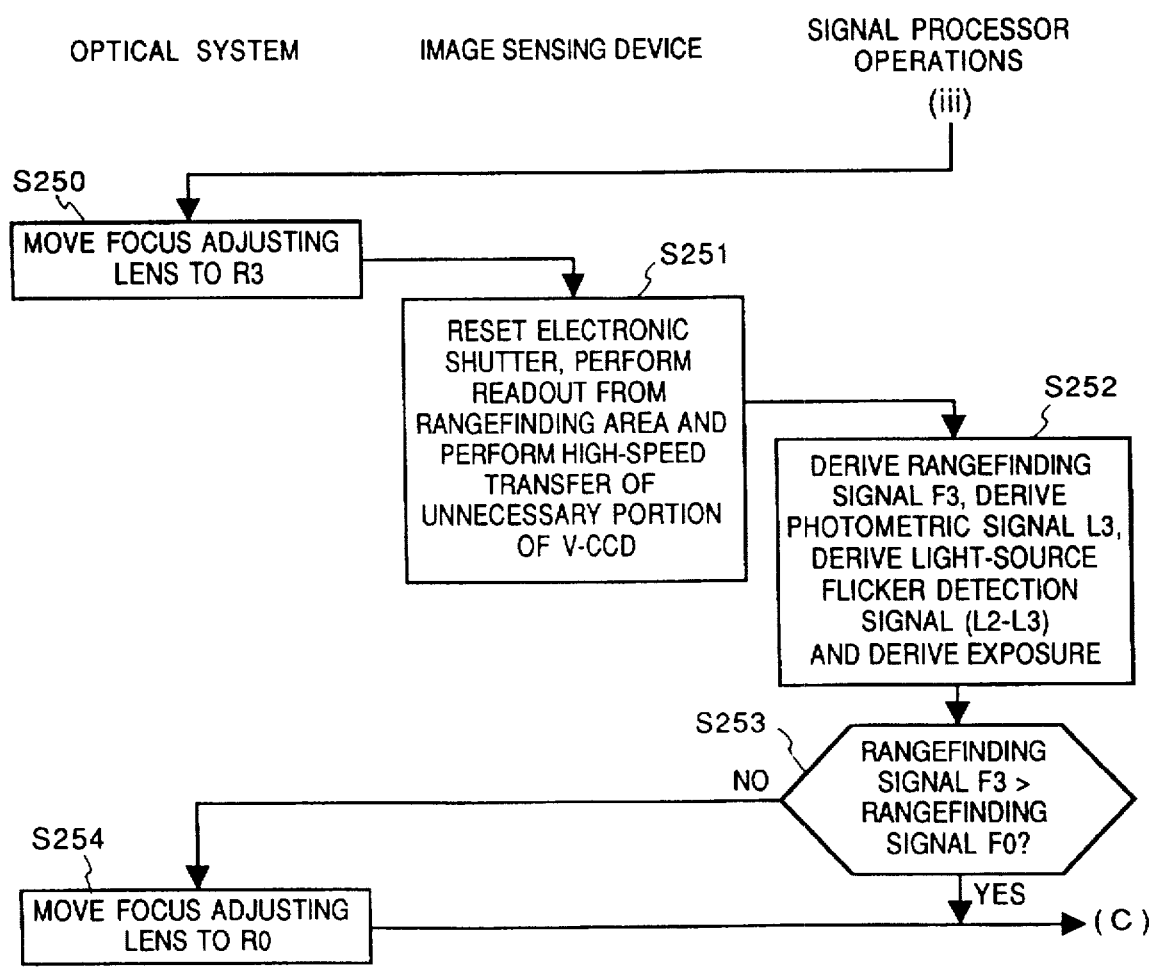
FIG. 7 is a flowchart, which is a continuation of FIG. 6, illustrating a subroutine for focus adjustment, fine adjustment of exposure and detection of light-source flicker.

In a case where the rangefinding signal F0 is found to be greater than the predetermined value a at step S214 in FIG. 4, a decision is rendered to the effect that adjustment of focus is possible and the focus adjusting lens is moved to R1 (step 216). Since R1=2 holds when R1 is initially set, the focus adjusting lens is moved to the position 2 in FIG. 13. At the completion of movement of the focus adjusting lens, the electronic shutter is set to the shutter speed derived from the photometric signal L0 and the signal of the image-capture rangefinding area is read out in the same manner as at step S212 (step S217). A rangefinding signal F1 and a photometric signal L1 are derived from the signal read out, the amount of the next exposure is decided and the photometric signal L1 is subtracted from the photometric signal L0, whereby a light-source flicker-detection signal is derived (step S218). Note that the reset of the shutter speed in step S217 or S221 etc. gives no influence on the derivation of a rangefinding signal. This signal is capable of being used in the following manner: Specifically, a light source exhibiting flicker, such as a fluorescent lamp, is detected and the color reproducibility thereof is corrected using the flicker signal in the course of image signal processing, or the fact that a light source illuminating a subject has been changed in the course of focus adjustment is detected using the flicker signal.

Next, the rangefinding signals F1 and F0 are compared in magnitude (step S219). If the rangefinding signal F1 is larger, then it is construed that a point of optimum focus is present on the side of short focal length and processing from step S225 onward is executed. If the rangefinding signal F1 is smaller, this means that the point of optimum focus is at lens position 0 or 1. The program therefore proceeds to step S220, where the focus adjusting lens is moved to R2=1. At completion of movement of the focus adjusting lens, the electronic shutter is set anew and the rangefinding zone for image capture is read out (step S221).

Next, a rangefinding signal F2, a photometric signal L2 and a light-source flicker detection signal (L1–L2) are derived in a manner the same as that executed at step S218 (step S222) and the rangefinding signals F2 and F0 are compared in magnitude (step S223). If F2>F0 holds, it is judged that adjustment of focus is completed, this subroutine is terminated and processing returns to the main routine. On the other hand, if F2≦F0 holds, the focus adjusting lens is moved to R0=0 (step S224), this routine is terminated (step S224) and then the program returns to the main routine.

If F1>F0 is found to hold at step S219, it is determined whether R0 is 10 or not (step S225). Since R=0 holds in this instance, the program proceeds to step S226. Here the changes R1=R0+2=2, R1=R1+2=4, R2=R2+2=3, R3=1, F0=F1 and L0=L1 are made and the focus adjusting lens is moved to R1 (=4) by the setting of these constants (step S228). When movement has been completed, the signal of the image-capture rangefinding area exposed at the set shutter speed is read out (step S229).

Operation according to steps S230–S234 is the same as at steps S219–S223 in FIG. 4. If F2<F0 holds at step S234, this means the point of optimum focus is on the long focal-length side of R0 (=2). The focus adjusting lens is moved to R3=1. Completion of the moving operation is awaited, the output of the captured image is read out in the same manner as at steps S232, S233 and each signal is derived. If F3>F0 is found to hold at step S238, then the focus adjusting lens is kept as is. If F3≦F0 holds, the focus adjusting lens is moved to R0 (=2), it is construed that focus adjustment has been completed, this subroutine is terminated and the program returns to the main routine. If F1>F0 holds at step S230, it is deemed that the point of optimum focus is on the side of short focal length, the program returns to step S225 again and processing similar to that set forth above is executed. After this operation has been repeated five times, the program proceeds from step S225 to step S240 at the stage at which R0=10 is established.

At step S240, the settings R0=R0=(10), R1=R0+1=(11), R2=R0+2=(12), R3=R0−1=(9), F0=F1 and L0=L1 are made and the focus adjusting lens is moved to R1, namely to lens position 11 (see FIG. 13) (step S228). When movement has been completed, the timing of the electronic shutter is set so as to establish the proper amount of exposure and then signal of the image-capture rangefinding area is read out (step S242). The rangefinding signal F1 and photometric signal L1 are derived to derive the light-source flicker detection signal and amount of exposure (step S243). The rangefinding signals F0 and F1 are compared at step S244. If the rangefinding signal F0 exhibits a higher focusing rate and F0>F1 holds, the program proceeds to step S250. If F0>F1 does not hold, the focus adjusting lens is moved to R2, namely to lens position 12 (step S245). Upon completion of movement, the electronic shutter is set again and the signal of the rangefinding area is read out (step S246). A rangefinding signal F2, a photometric signal L2, the light-source flicker detection signal and the amount of exposure are derived. The rangefinding signals F2 and F1 are compared at step S248. If F2>F1 does not hold, then the focus adjusting lens is moved to R1 (=11) (step S249) and this subroutine is ended. When F2>F1 holds, this subroutine is terminated as is and the program returns to the main routine.

When F0>F1 is found to hold at step S244, first the focus adjusting lens is moved to R3 (=9) (step S250) then signal readout is performed and each detection signal is derived (step S251). A rangefinding signal F3 is compared with the rangefinding signal F0. If F3>F0 does not hold, the focus adjusting lens is moved to R0 (=10). If F3>F0 holds, then this subroutine is terminated as is and the program returns to the main routine.

With reference again to FIG. 2, shutter speed and diaphragm aperture are decided by the exposure setting on the basis of the photometric signal derived from the output of the image captured at the preceding amount of exposure. The diaphragm aperture and shutter speed that have been decided are set and the image signal of the rangefinding area or of all pixels is read out. Furthermore, a referred rangefinding signal (Fx) as a detection signal for focus adjustment and a referred photometric signal (Lx) as an exposure correction signal are derived on the basis of the image signal that has been read out (step S4), because the rangefinding signal and the photometric signal may change in accordance with a change of the diaphragm aperture.

Next, whether or not the second stroke switch SW2 is being pressed is detected (i.e., whether or not an image-sensing command has been issued) (step S5). If the switch SW2 is not being pressed, the rangefinding signal F1, which prevails at the lens position where optimum focus is obtained, is compared with the detection signal Fx for focus adjustment (step S6). If the difference between these two signals is less than a predetermined value, this means that the focused state has been achieved. Then, with the lens position left as is, an exposure correction signal is produced, light-source flicker is detected (step S7) and the program returns from step S7 to step S5.

If the difference between the rangefinding signal F1 and the detection signal Fx for focus adjustment is found to be greater than the predetermined value at step S6, this means that the apparatus is out of focus and, hence, focus is re-adjusted. In this case, the lens position for start of readjustment is made R0-2 (step S8) in order to start from a point near the lens position which prevailed at the time of the previous adjustment of focus. The program then returns to step S3. Processing similar to that described above, namely for readjustment of focus and fine adjustment of exposure, is executed at steps S3 and S4, and this processing is repeated until depression of the second stroke switch SW2 is detected. If the focusing lens position is shifted by a large amount toward the telephoto side in this case, the operation R0-2 is repeated.

Figure 8:
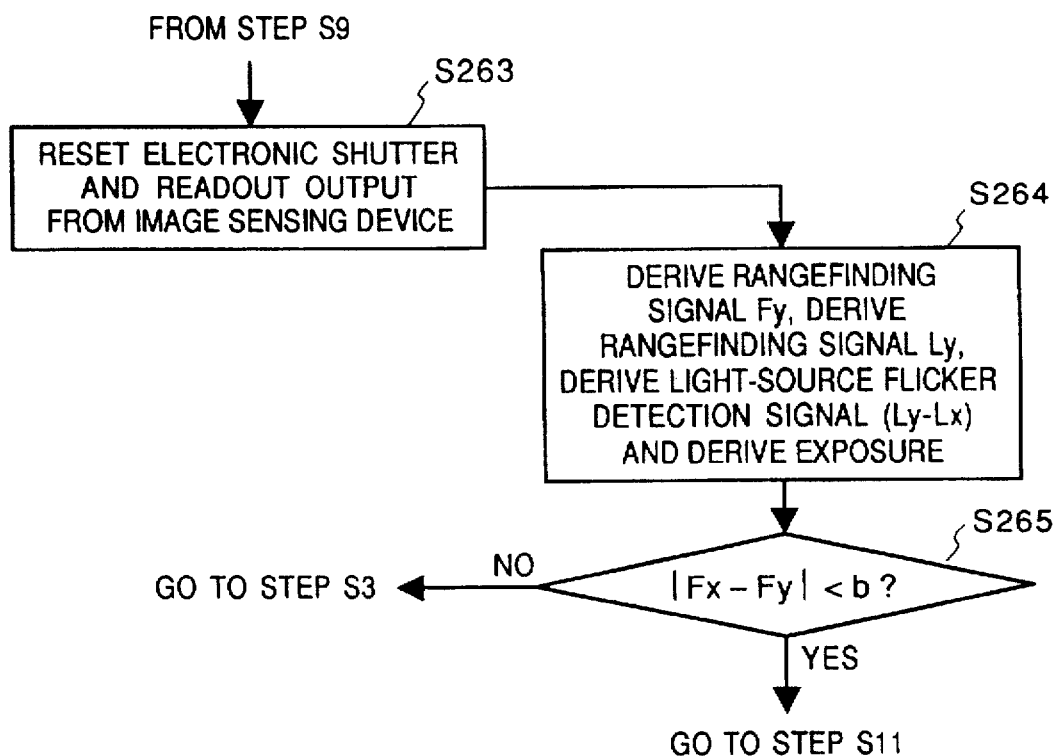
FIG. 8 is a flowchart illustrating the processing procedure of a step S10 in FIG. 2.

If depression of the second stroke switch SW2 is detected at step S5, then the program proceeds to step S9, where it is determined whether the auto-focus lock (AF LOCK) has been applied. If the auto-focus lock (AF LOCK) has been applied, then the program proceeds directly to step S11; otherwise, the focused state is verified at step S10. FIG. 8 is a flowchart illustrating the processing procedure of step S10 in FIG. 2. The verification of the focused state at step S10 is performed by processing similar to that of the above-described step S4 with the exception of adjustment of the diaphragm, which has already been set. In other words, exposure is performed by a prescribed time by the electronic shutter and the output of the image sensing device 4 is read out (step S263). A rangefinding signal Fy and a photometric signal Ly are derived on the basis of the signal that has been read out (step S264). If the difference between the rangefinding signal Fy and the detection signal Fx for focus adjustment is less than a predetermined value b, it is judged that the focused state has not changed and the program proceeds to step S11 (step S265). If the difference is greater than the predetermined value b, then the program returns to step S3 and readjustment is carried out.

Figure 9:
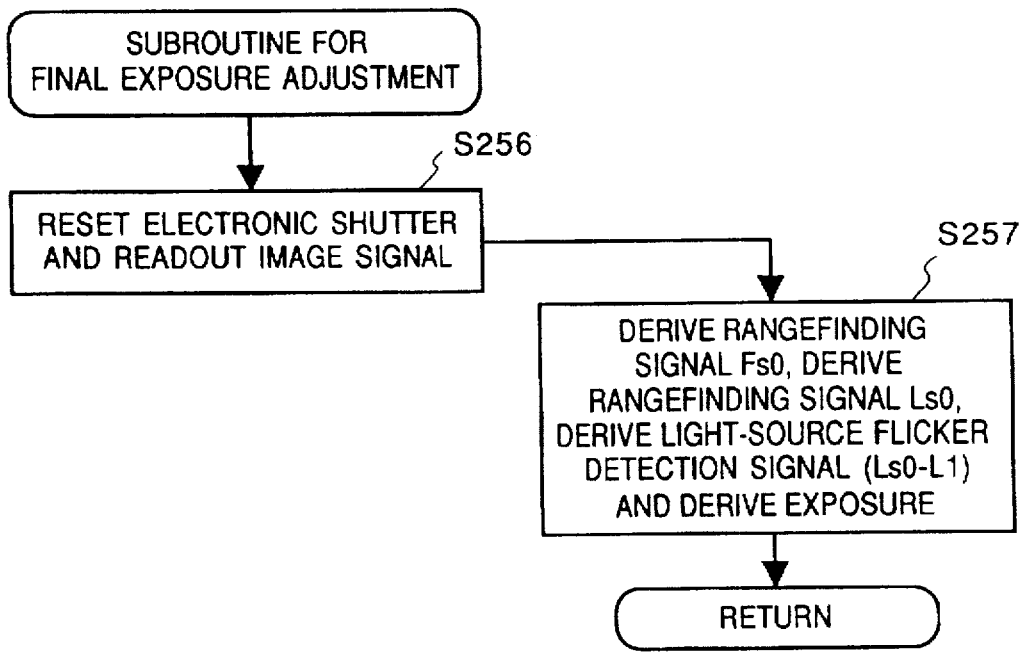
FIG. 9 is a flowchart illustrating a subroutine for final adjustment of exposure at step S11 in FIG. 2.

Final adjustment of exposure is performed at step S11 in FIG. 2. FIG. 9 is a flowchart illustrating the subroutine for final adjustment of exposure at step S11 in FIG. 2. The image signal resulting from exposure under the exposure conditions decided by the preceding photometric signal is read out (step S256) and, on the basis of this signal, a final photometric signal Ls0 and the flicker detection signal are derived (step S257).

In this case, all pixels are read out rather than the pixels in a specific area of the image sensing device 4, the range of detected pixels for photometry is widened, the level at the center portion of the image sensing device and the level of each area surrounding the center portion are detected, photometry for evaluation is performed by comparing these values and the accuracy of AE adjustment may be raised. Also, in the operation prior to final adjustment of exposure, photometry for evaluation may be performed in a similar manner by widening the range of readout from the image sensing device 4 to a degree that will not cause problems in terms of shortening time. After final adjustment of exposure is performed in the manner indicated above, main exposure and photography are carried out (step S12).

In main exposure and photography, the output of the image sensing device 4 is read out after exposure is performed based upon the set values derived by final exposure adjustment, the signal read out is processed and the processed signal is recorded on the recording medium 101. In a case where the flicker detection signal detected at each adjustment stage has exceeded the predetermined value, a decision is made to the effect that the light source at the location of photography is a fluorescent lamp. In this case, therefore, better color reproduction can be obtained by lowering the gain of the green-signal system in the image signal processor in conformity with the magnitude of the flicker signal.

Furthermore, the focus adjusting lens is moved to infinity. As a result, the image sensing lens will have been moved to infinity the next time the image sensing operation is started. This makes it possible to shorten the time needed for movement.

In the embodiment described above, coarse adjustment of exposure is performed by reading out the image signal a single time. However, in a case where the photometry range of the image sensing device 4 is broad and the output of the image sensing device 4 does not reach a focus-enabling signal level by a single readout, the readout of the image output for coarse adjustment of exposure may be performed several times to set the proper amount of exposure.

In accordance with the image sensing apparatus of the first embodiment as illustrated above, the processing operations of automatic exposure (AE), auto-focus (AF) and automatic white balance (AWB) are executed without using any photoelectric transducers other than the image sensing device 4. Moreover, in the image-sensing preparatory interval, the drive of the image sensing element is performed at a rate different from that for ordinary readout. By combining various readout methods whose rates differ from that of the ordinary readout rate, adjustment can be completed in a short time.

Further, since the diaphragm is stopped down to minimum aperture and the shutter time is minimized at the time of coarse imaging adjustment to make the amount of exposure as small as possible, the amount of accumulated electric charge of each pixel becomes small with regard to the dynamic range of the image sensing device 4 and it becomes possible to cope with a wide photometry range without saturation of the image sensing device. On the other hand, owing to the reduction in the amount of exposure, the proportion of noise in the image output rises. However, averaging is carried out by mixing of pixels during transfer within the image sensing device and by integration in the processing regarding the output of the image sensing device 4. Accordingly, the influence of noise is reduced and can be made a level which will not cause harm at the stage of course adjustment.

In the foregoing embodiment, both the diaphragm aperture and shutter speed are controlled. However, depending upon the width of the photometry range, one or the other may be controlled. Also, rather than using the fastest shutter speed or smallest aperture, setting which are lower or higher may be made.

Further, by reading out an image signal at a rate which differs from the ordinary readout rate, flicker components of a light-source such as a fluorescent lamp can be detected at 100 Hz or at 120 Hz. As a result, whether the light source at the location of photography is or is not the flickering light source can be determined based upon the level of the flicker components. This means that a color correction conforming to the light source or information concerning the location of photography can be recorded simultaneously as attribute information together with the image and audio.

Further, in a case where the limitation of the amount of exposure based upon setting of the diaphragm and shutter speed cannot be performed satisfactorily in the photometry range and the signal attains saturation in the vertical transfer portion of the image sensing device, the method of reading out the signal from the image sensing device can be made one in which pixels in the vertical direction are read out while skipping single pixels. This is so-called frame readout and makes it possible to lower the sensitivity of the image sensing device. In addition, saturation in the vertical transfer portion can be prevented. This makes it possible to deal with exposure adjustment in an effective manner.

Second Embodiment

An image forming apparatus according to a second embodiment of the invention will now be described. In the first embodiment, the auto-focus lock at step S9 in FIG. 2, the focused-state confirmation at step S10 and the final adjustment of exposure at step S11 are implemented after the second stroke switch SW2 is pressed. In the image sensing apparatus according to the second embodiment, however, it is permissible, for the sake of raising photographic response, to so arrange it that these operations are not carried out. These operations are usually performed because the probability that the distance or brightness of the subject will change rises when the time from the processing of step S4 to the pressing of the second stroke switch S2 is long.

Figure 14:
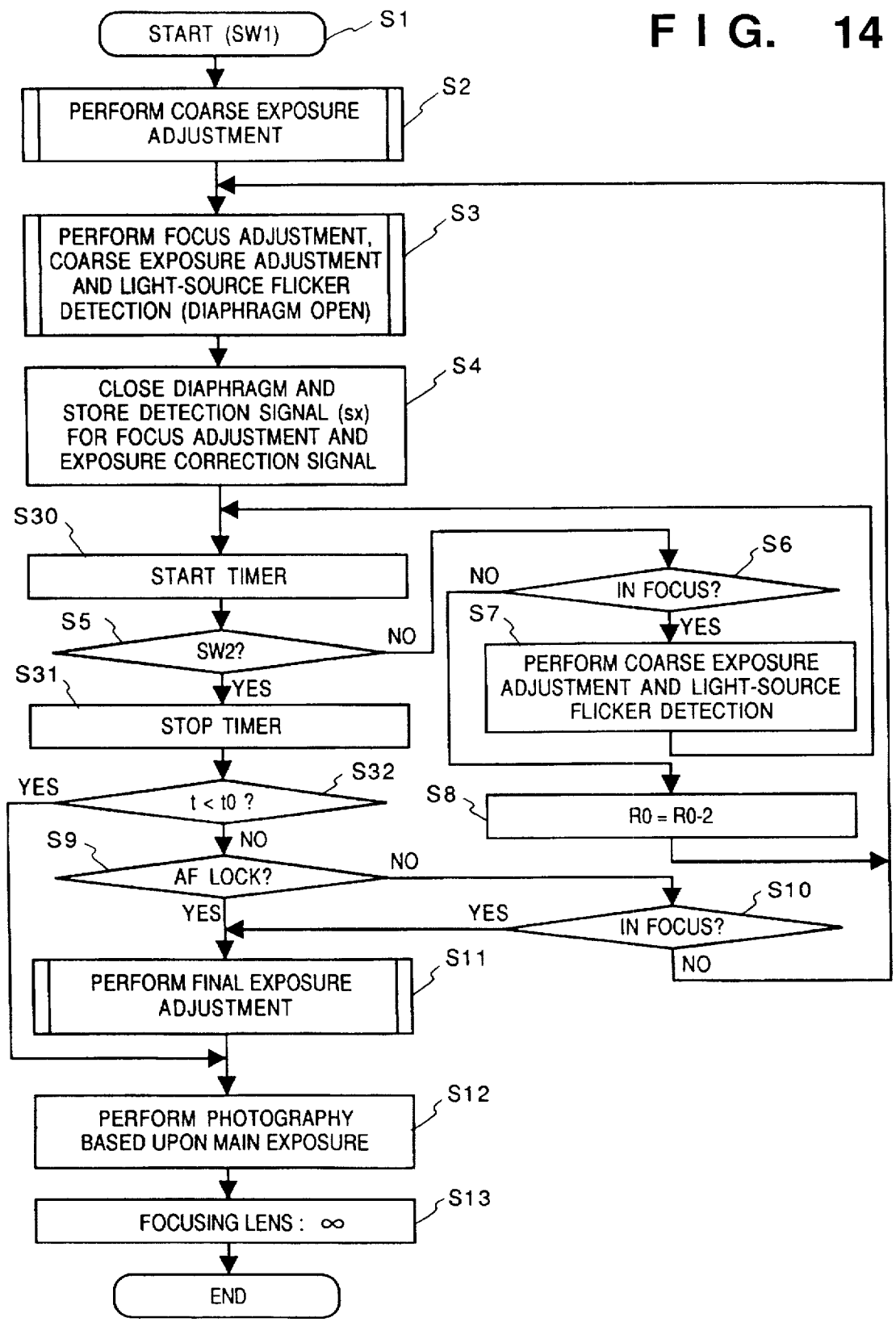
FIG. 14 is a flowchart illustrating a processing routine for image sensing according to a second embodiment of the invention.

FIG. 14 is a flowchart illustrating the image sensing processing routine according to the second embodiment. Steps identical with those of the first embodiment are designated by like reference characters and have the same operations associated with them in the embodiment that follows.

The time from the end of processing of step S4 to the pressing of the second stroke switch SW2 is measured by a timer (steps S30, S31). Steps S9, S10 and S11 are omitted if the measured time is less than a predetermined time and are executed if the measured time exceeds the predetermined time (step S33). This makes it possible to raise photographic response.

Third Embodiment

Figure 15:
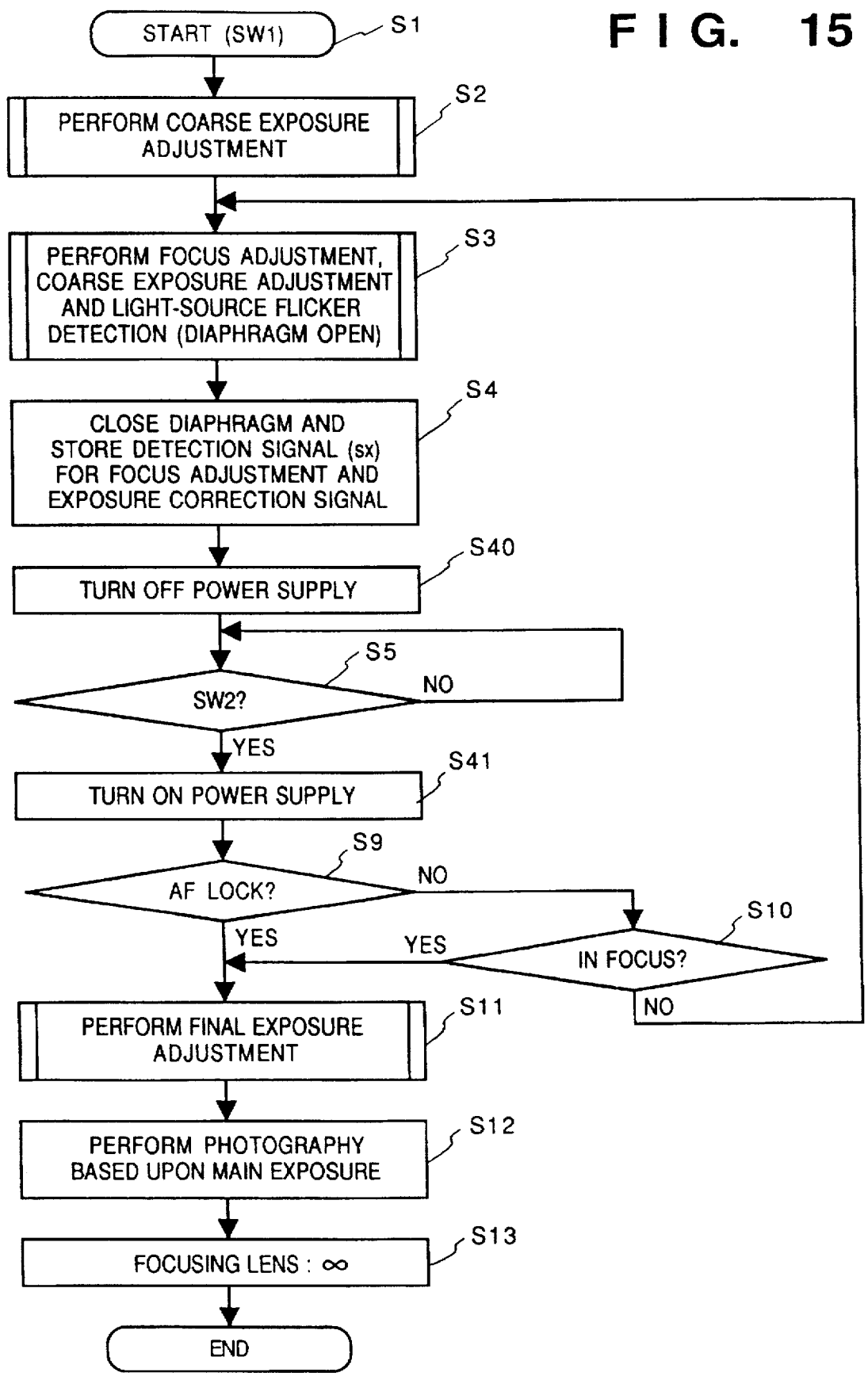
FIG. 15 is a flowchart illustrating a processing routine for image sensing according to a third embodiment of the invention.
Figure 16:
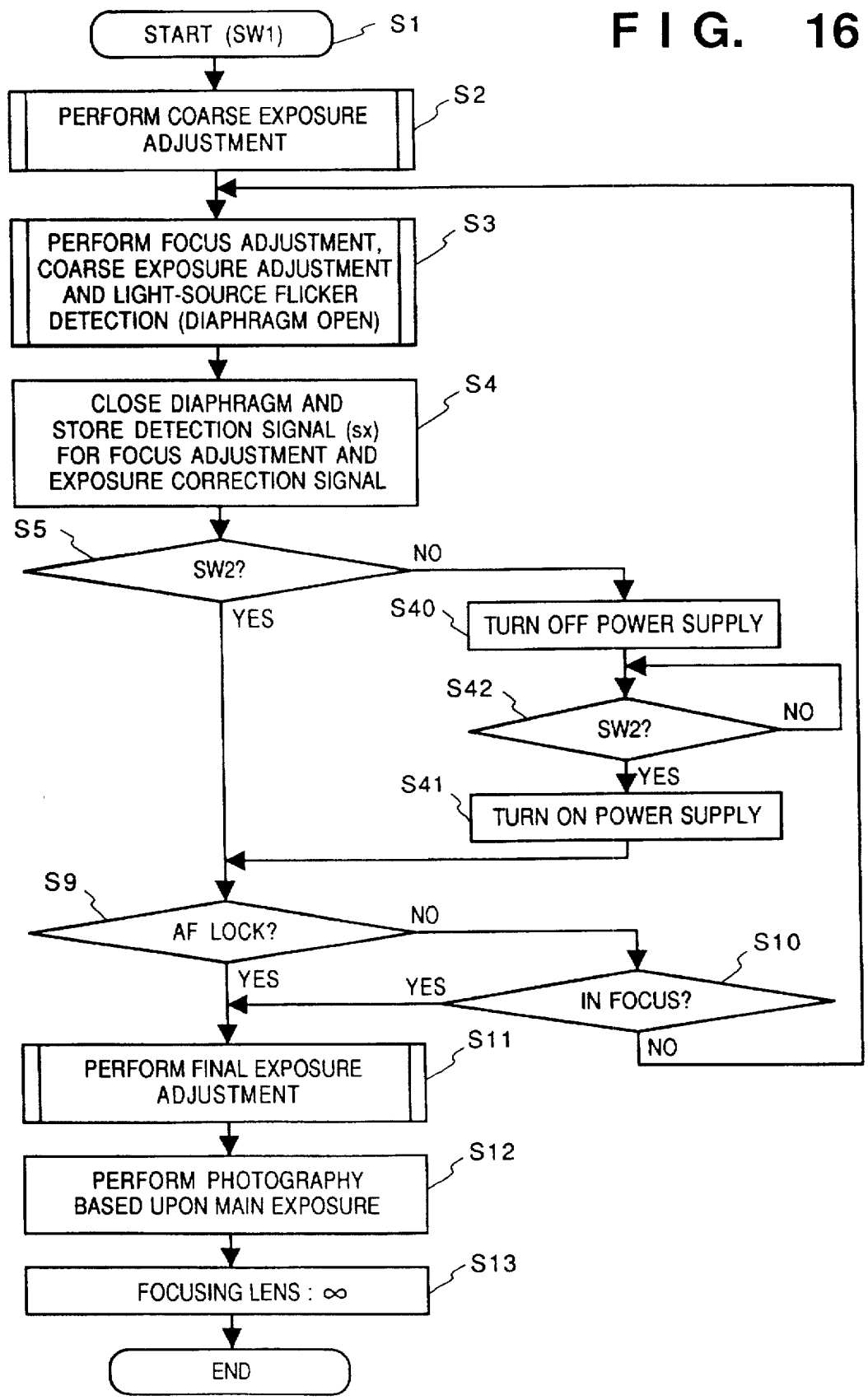
FIG. 16 is a flowchart illustrating a modification of a processing routine for image sensing according to the third embodiment of the invention.

According to the first and second embodiments, it is so arranged that the power supply of the image sensing system is turned on by the first stroke switch SW1 and is not turned off until the completion of image capture. However, it is permissible to cut off this power supply once the adjustment at step S4 in FIG. 2 is completed. FIG. 15 is a flowchart illustrating the processing routine for image sensing according to the third embodiment. The power supply of the image sensing system is turned off once the adjusting at step S4 in FIG. 15 is completed (step S40). After the power supply is cut off, the apparatus waits for confirmation of the fact that the second stroke switch SW2 has been pressed (step S42). Upon confirmation of pressing of the second stroke switch SW2, supply of power to the image sensing system is resumed (step S41) and the program then proceeds to step S9.

Thus, in a case where the photographer presses both the first- and second stroke switches SW1 and SW2 substantially simultaneously to execute quick photography, i.e., in case where the second stroke switch SW2 is already being pressed at the moment step S4 ends, the photographic operation can be continued without interrupting the supply of power. This makes it possible to shorten the time needed for photography. On the other hand, in a case where the time between pressing of the first stroke switch SW1 and pressing of the second stroke switch SW2 is not used to perform an operation, the power supply is interrupted temporarily, thereby making it possible to conserve electric power.

Thus, in a case where the power supply is turned on and off in the course of the photographic operation, as illustrated above, the time constant of a clamping circuit is reduced or the active time of clamping pulses immediately following the supply of power is lengthened so that the start-up time of the circuitry can be curtailed.

By making the settings in this manner, it is possible to shorten the time from resumption of supply of power to the start of readout of the image signal from the image sensing device. This expedient is useful in curtailing the time needed for photography.

Fourth Embodiment

Figure 17:
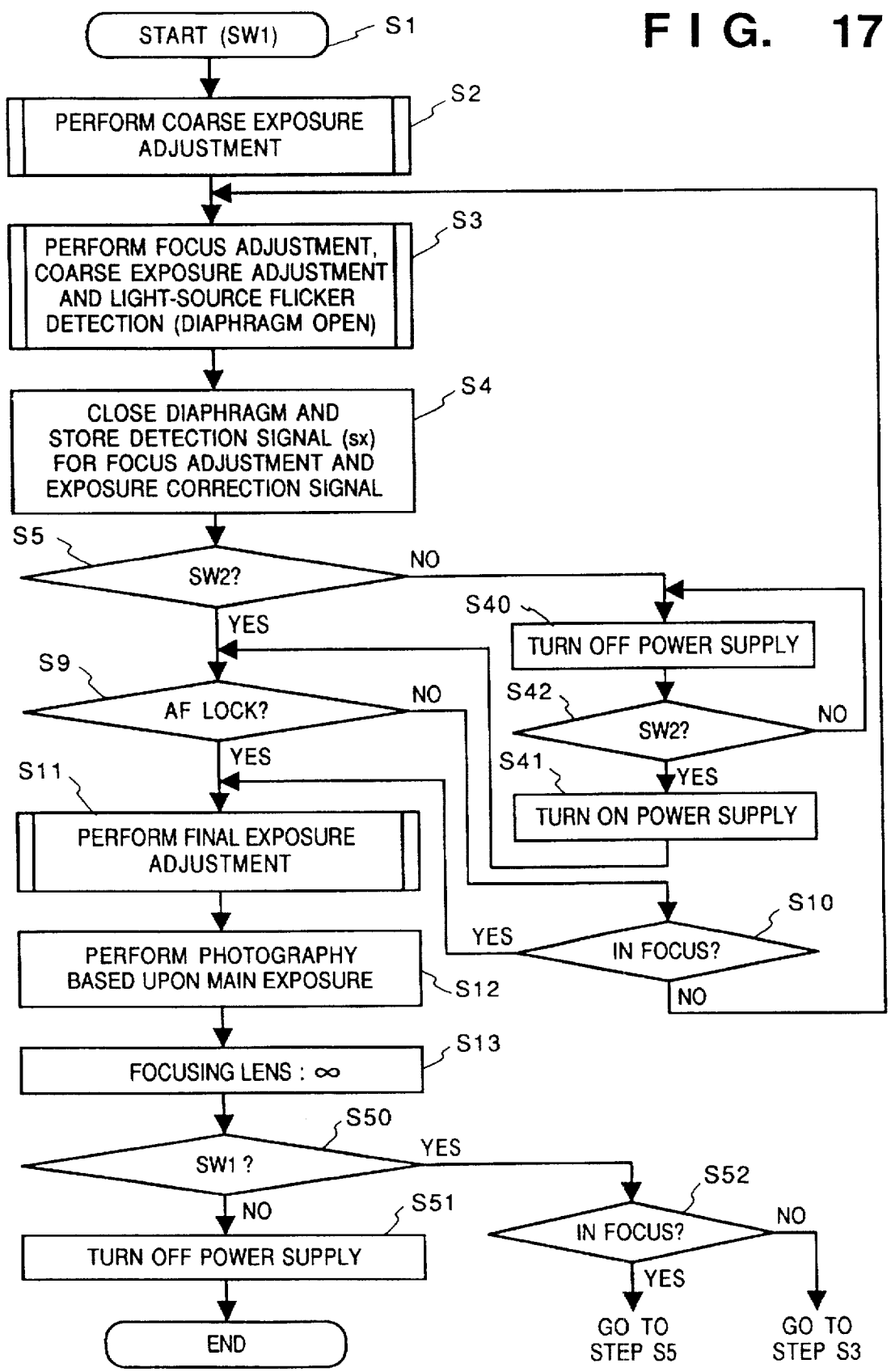
FIG. 17 is a flowchart illustrating a processing routine for image sensing according to a fourth embodiment of the invention.

An image sensing apparatus according to the fourth embodiment will now be described. FIG. 17 is a flowchart illustrating the processing routine for image sensing according to the fourth embodiment. In this embodiment, it is determined whether the first stroke-switch SW1 is being held depressed after the first image capture has completed and then the focusing lens has been moved to the infinity position at step S13. If switch SW1 is not being pressed, the power supply is turned off (step S51) and the main routine is terminated. If it is found at step S50 that the first stroke switch SW1 is being pressed, then the program proceeds to step S52. Here the photographic operation is performed at a diaphragm aperture similar to that of the preceding photographic operation and the focused state is verified based upon the level of the rangefinding signal prevailing at this time. If the difference between the present value and the preceding evaluation value is less than a predetermined value, then it is judged that the image is in focus and the apparatus waits for the second stroke switch SW2 to be pressed at step S5. When the focused state cannot be verified at step S52, the program proceeds to step S3 and adjustment is performed again from the adjustment of focus.

In a case where this readjustment of focus is performed, the image sensing lens 1 starts from the vicinity of the position of the focusing lens which was occupied at the immediately preceding photographic operation, thereby making it possible to raise the probability that the focus adjustment will be completed in a shorter period of time. Further, an arrangement may be adopted in which, in a case where the time from end of the first photographic operation to the next photographic operation (pressing of the second stroke switch SW2) is long and the time over which the first stroke switch SW1 is being pressed has exceeded a prescribed time, adjustment of focus is resumed immediately without verifying the focused state. In this case, since the probability that the distance to the subject has changed is high, time need not be wasted by verifying the focused state.

Fifth Embodiment

Figure 18:
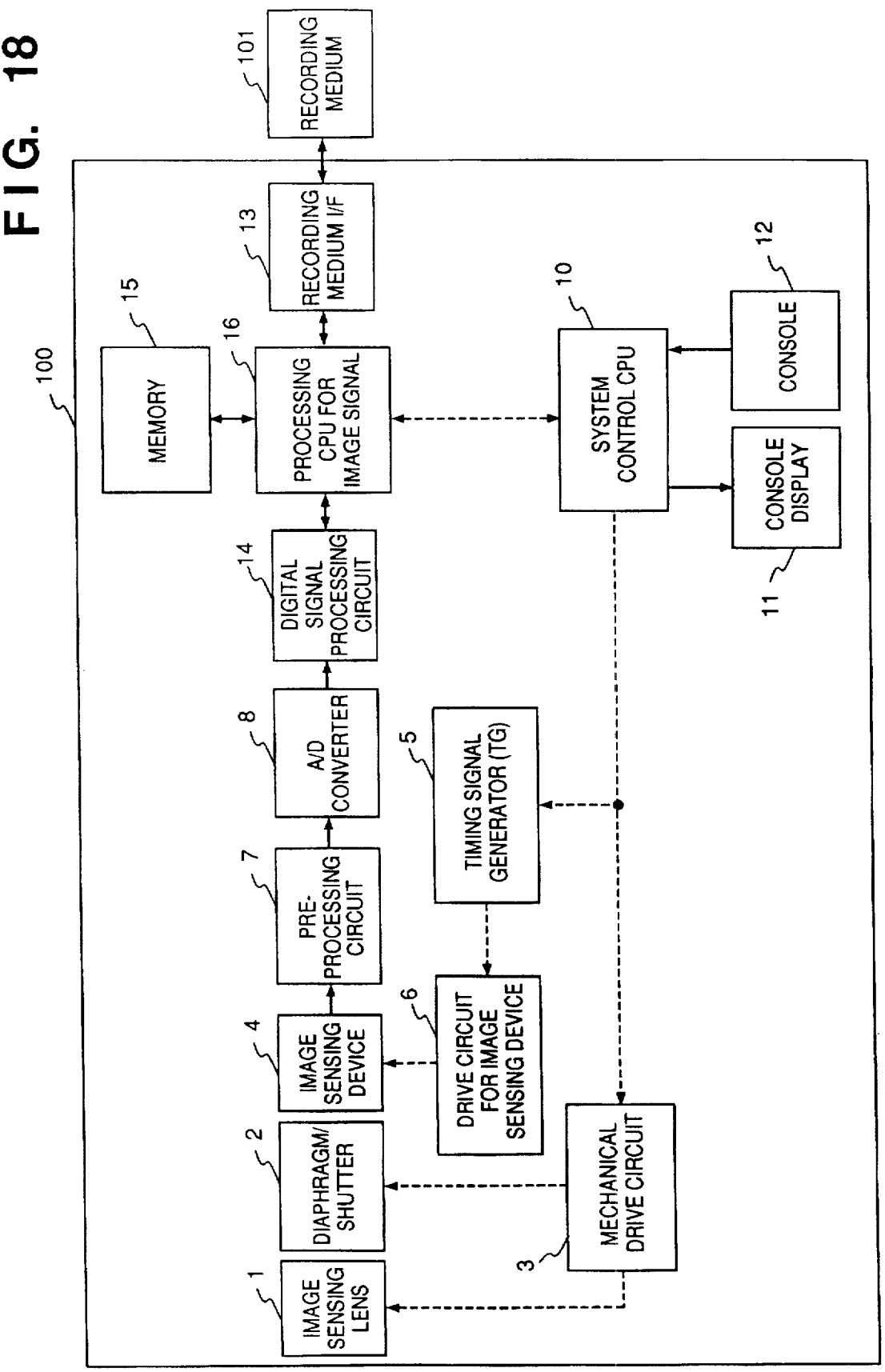
FIG. 18 is a block diagram illustrating the construction of an image sensing apparatus according to a fifth embodiment of the present invention.

An image sensing apparatus according to a fifth embodiment will now be described. FIG. 18 is a block diagram illustrating the construction of the image sensing apparatus according to the fifth embodiment. In FIG. 18, the blocks 1–13 are identical to the blocks having the same reference numerals in the arrangement of the first embodiment shown in FIG. 1 Numeral 14 denotes a digital signal processing circuit for storing the output of the A/D converter 8 and then executing signal processing. Numeral 15 denotes a memory for storing the image signal, an audio signal from an audio input unit (not shown) or attribute information such as an identification code (ID) added onto these signals. Numeral 16 designates a CPU for subjecting a sensed image to signal processing.

Processing of the sensed image in the image sensing apparatus of this embodiment constructed as set forth above is similar to that of the first embodiment. Processing for converting the output of the image sensing device 4 to a recordable format and preparatory processing for implementing proper photography, such as processing for autofocus (AF), automatic exposure (AE) and automatic white balance (AWB) is executed using the digital signal processing circuit 14, the memory 15 and the CPU 16. More specifically, in the first embodiment, high-speed processing required from the moment the first stroke switch SW1 is pressed (step S1) to the moment final adjustment of exposure is performed (step S11), namely signal processing for obtaining the detection signals indicative of auto-focus (AF), automatic exposure (AE) and automatic white balance (AWB), is required to be performed in a short period of time. As a result, processing is executed not by the CPU 16 for image signal processing but by the digital signal processing circuit 14.

For example, an integrating circuit is required for AF signal processing, and color-separation processing, conversion to a color-difference signal, a p—p clipping circuit and RGB non-detection processing, etc., are required for the AWB signal processing. However, such processing represents well-known techniques in the art and the details thereof need not be described here.

Thus, according to this embodiment, some of the signal processing is executed by the digital signal processing circuit 14. As a result, processing can be executed in a shorter period of time in comparison with the case in which signal processing is executed by a program.

Sixth Embodiment

An image sensing apparatus according to a sixth embodiment will now be described. In implementing coarse adjustment of exposure in the first embodiment, the greater the dynamic range of the image sensing device, the wider the photometry range is set. With regard to the dynamic range of a CCD, the dynamic range of the photosensitive portion is decided by the potential of the substrate and the dynamic range of the transfer portion is decided by the amplitude of the driving pulses.

Figure 19:
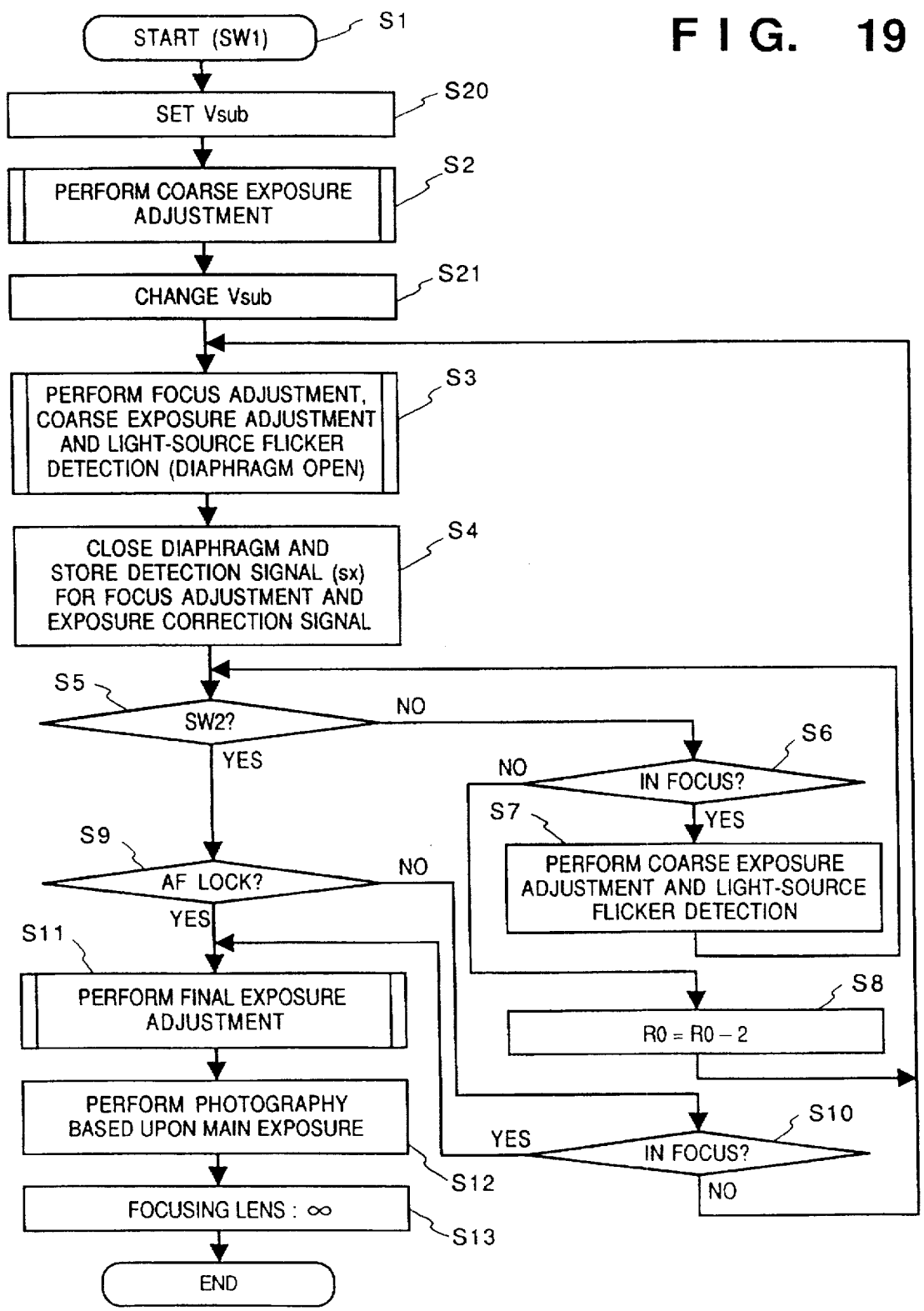
FIG. 19 is a flowchart illustrating a subroutine for coarse adjustment of exposure according to a sixth embodiment of the invention.

FIG. 19 is a flowchart illustrating a subroutine for coarse adjustment of exposure according to a sixth embodiment of the invention. In the main routine, the setting of a potential Vsub of the substrate is performed at step S20 when the coarse adjustment of exposure is carried out. This set value is made lower than the set value which prevails at the time of ordinary readout, and the dynamic range of the photoelectric transducer portion of the image sensing device 4 is set to be wide.

Though the frequency of the occurrence of blooming increases at this time, electric charge which overflows to adjacent pixels owing to blooming is eventually mixed and summed in its entirety by an integrating circuit and therefore no particular problem arises because the objective is coarse adjustment of exposure. Furthermore, when electric charge of a sensed image produced in the photoelectric transducer portion is transferred to the vertical transfer portion, overflow occurs owing to signal charge in excess of the dynamic range. However, no problems arise because the objective is as stated above. In addition, readout of the transfer portion is performed by the frame-readout method, thereby making it possible to prevent saturation in the vertical transfer portion.

A situation is conceivable in which the spectral sensitivity of the image sensing device 4 changes owing to adjustment of the substrate potential Vsub, as a result of which the image sensing sensitivity changes. (Owing to lowering of the substrate potential Vsub, electric charge corresponding to light of long wavelength generated in the deep portion of the image sensing device 4 accumulates and, hence, infrared sensitivity rises.) However, it is permissible to substitute an infrared cutting filter having a different characteristic or to control the amount of correction of exposure correspondingly.

Further, though solely the substrate potential Vsub is changed in the foregoing embodiment, it is permissible to set a wide dynamic range for the vertical transfer portion by changing the amplitude of the transfer pulses.

In the first embodiment described above, the gain of the AGC circuit in the preprocessing circuit 7 of FIG. 1 is set to a value equal to that of the gain at the time of main exposure. This gain is set, at the time of manufacture of the image sensing apparatus, in dependence upon the sensitivity of the image sensing device 4. According to this embodiment, however, there is a possibility that the image signal read out at the time of coarse adjustment of exposure will be outputted as a signal larger than the image signal read out at other times, such as at the time of main exposure, owing to manipulation of the substrate potential Vsub. It is required, therefore, to set a small gain for the preprocessing circuit at this time. Accordingly, the preprocessing circuit 7 is set to a low gain at the same time that the potential Vsub of the substrate is changed.

After the above-described processing is executed by coarse adjustment of exposure, the substrate potential Vsub is changed to the ordinary set value at step S21. All other processing is the same at that of the first embodiment and identical step numbers are used to identify this processing.

Seventh Embodiment

Figure 20:
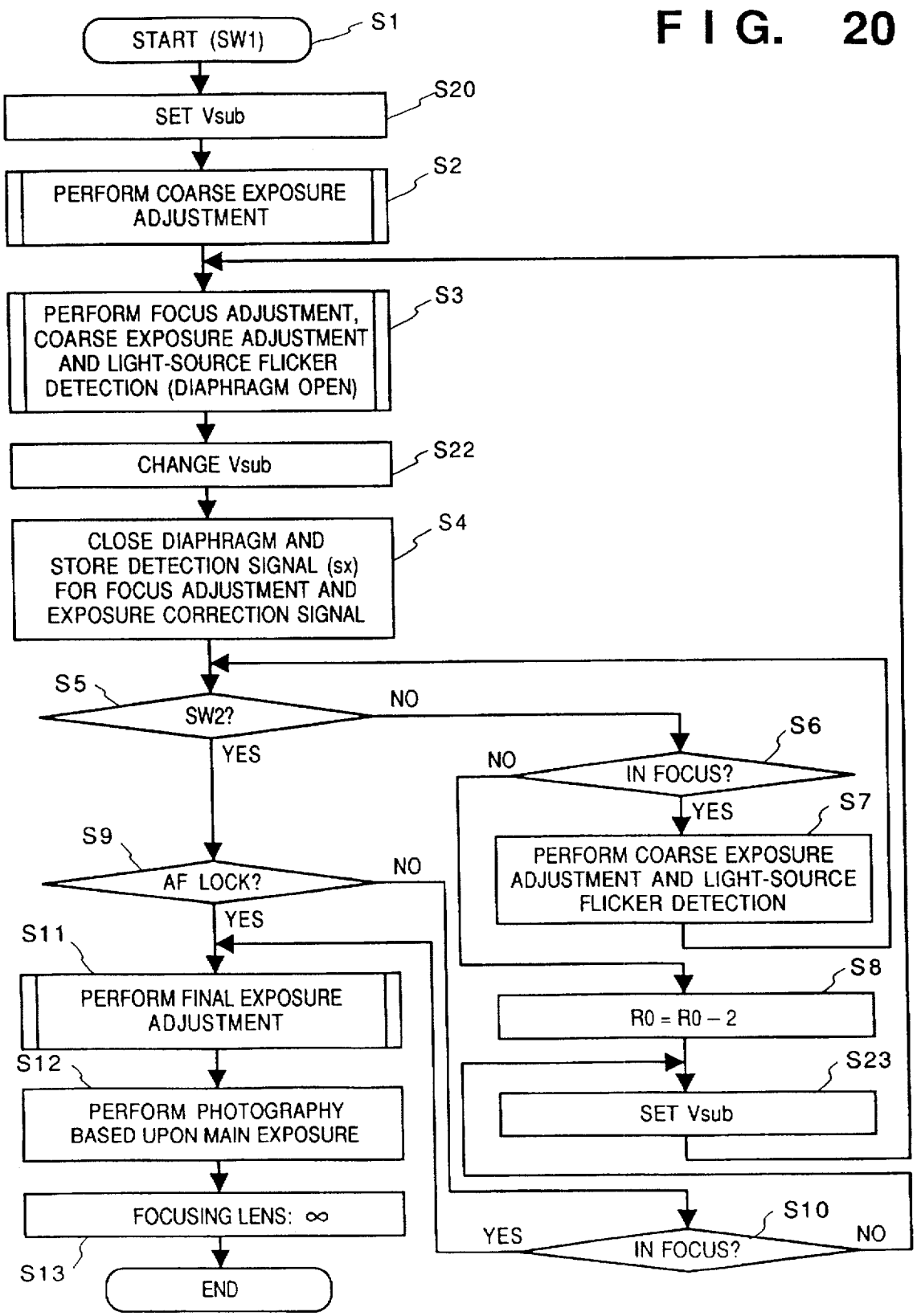
FIG. 20 is a flowchart illustrating a subroutine for coarse adjustment of exposure according to a seventh embodiment of the invention.
Figure 21:
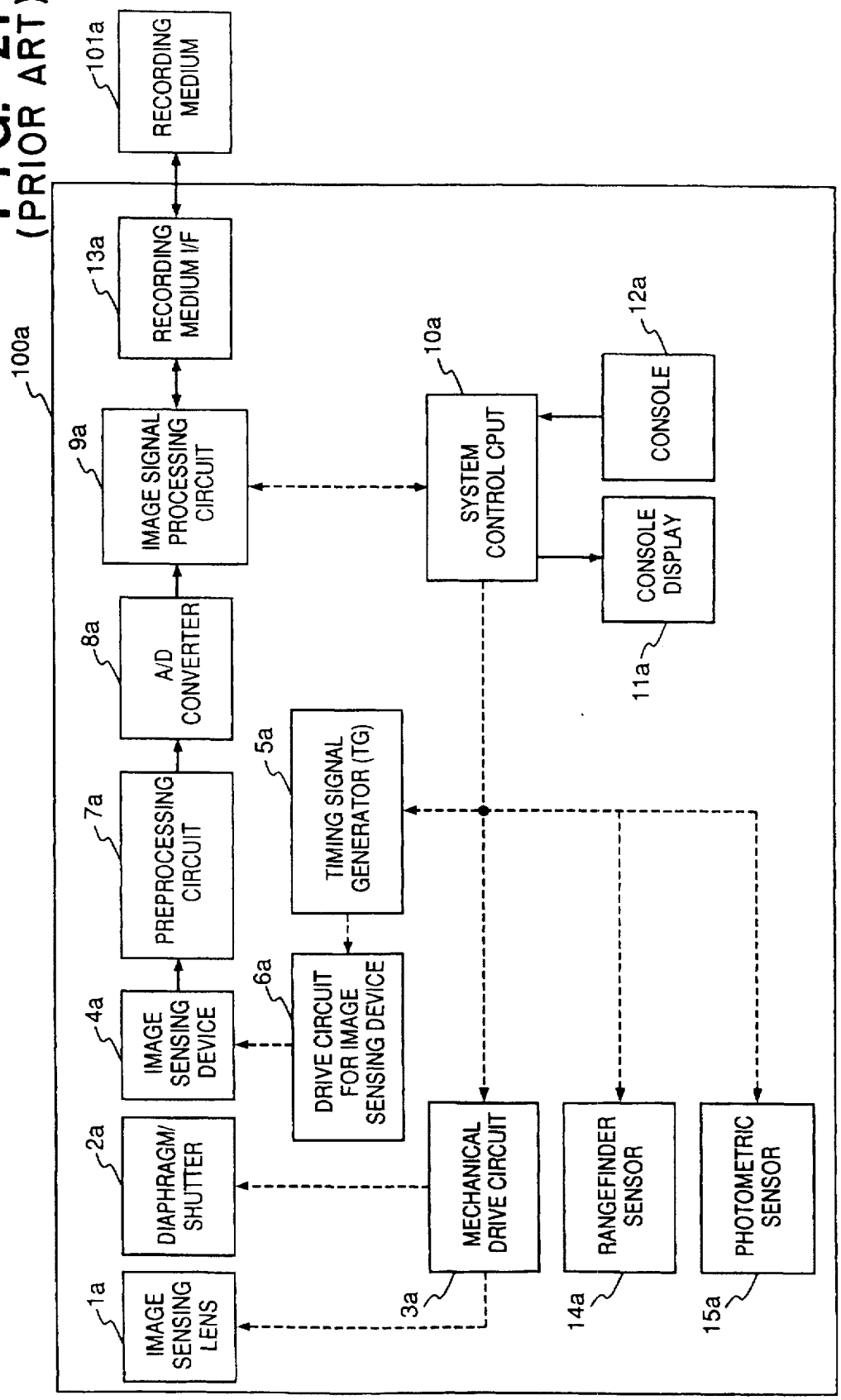
FIG. 21 is a block diagram illustrating the construction of a digital electronic camera according to the prior art.

An image sensing apparatus according to a seventh embodiment will be described. FIG. 20 is a flowchart illustrating a subroutine for coarse adjustment of exposure according to the seventh embodiment of the invention. In this embodiment, processing up to step S2 is the same as that of the sixth embodiment. After the coarse adjustment of exposure at step S2, the level of the substrate potential Vsub is not changed and adjustment of focus from step S3 onward is executed with the substrate potential Vsub kept low. Upon completion of the focus adjustment at step S3, the ordinary value is restored. In a case where adjustment of focus is performed again at step S3, the substrate potential Vsub is set to a low value again at step S23.

In accordance with the image sensing apparatus of this embodiment, the infrared sensitivity of the image sensing device is raised by performing exposure at a low substrate potential Vsub, thus making it possible to adjust focus even in dark locations. Since blooming tends to occur in the image sensing device 4 in this case, the amount of exposure of the image sensing device 4 may be set to be lower than that which prevails ordinarily. Furthermore, a method is available in which an infrared light pattern or a visible light pattern in the vicinity of infrared is projected upon a subject to measure the distance to the subject. If this method is combined with that of the present invention, the sensitivity of infrared light and of visible light near infrared is improved. As a result, rangefinding can be performed over longer distances. Further, an arrangement may be adopted in which the substrate potential Vsub is set low only when it is detected that the subject has illuminance below a certain level in coarse adjustment of the image sensing operation.

Eighth Embodiment

In the first through seventh embodiments illustrated above, the focus adjusting operation and exposure adjusting operation are described. However, an arrangement may be adopted in which a white-balance signal (WB signal), which is for detecting the color of the light source, is derived when the respective rangefinding signals F or photometric signals L are derived. In this case, one screen of the output of the image signal is integrated, the ratio of the R, B and G signal components is obtained from the integrated signal and each signal component is multiplied by a gain so as to correct the ratio of the components.

Further, in a case where the white-balance signal WB is detected and corrected whenever a readout is performed, the entry of a subject exhibiting a high degree of saturation into the picture has a great influence. Therefore, it is so arranged that the correction value is derived upon making reference to all WB signals detected not only from the signal prevailing at the time of this readout but also from signals read out prior to this. In this case, the correction value is derived upon weighting a readout signal nearer to the moment at which the image signal to be corrected is read out.

Here also a problem arises in which the light source illuminating the subject may change in a case where the direction of photography is changed in the course of pressing of the first stroke switch SW1. Accordingly, an arrangement is adopted in which the flicker detection value is observed, a change in the light source is recognized at the moment this value changes and the WB signal prevailing before the change is not used in the derivation of the correction value. This makes it possible to achieve a WB correction that is accurately adaptable to various conditions.

As many apparently widely different embodiments of the present invention can be made without departing from the spirit and scope thereof, it is to be understood that the invention is not limited to the specific embodiments thereof except as defined in the appended claims.

What is claimed is:

1. An image sensing apparatus comprising:

an image sensing device for converting an optical image to an electric signal;

focus evaluation-value detecting means for detecting a focus evaluation value, which indicates decree of focusing of the optical image by using said image sensing device;

focus adjusting means for performing focus adjustment, which is for focusing the optical image on said image sensing device, based upon the detected focus evaluation value;

exposure-amount detecting means for detecting a proper amount of exposure by using said image sensing device;

exposure adjusting means for performing exposure adjustment in accordance with the detected Proper amount of exposure;

a first release switch for designating start of the focus adjustment and start of the exposure adjustment;

main-exposure image sensing means for performing main exposure after the adjustments of focus and exposure;

a second release switch for designating start of the main exposure;

a diaphragm for limiting amount of exposing light impinging upon said image sensing device;

wherein said focus evaluation-value detecting means, detects a first focus evaluation value upon placing said diaphragm in an opened state in response to a command from said first release switch;

detects a second focus evaluation value upon making aperture diameter of said diaphragm approximately the same as that at main exposure after the focus adjustment is performed by said focus adjusting means in accordance with the detected first focus evaluation value; and detects a third focus evaluation value upon establishing a diaphragm state approximately the same as that at main exposure in response to a command from said second release switch; and said main-exposure image sensing means compares said second and third focus evaluation values and performs main exposure when the difference between these values is less than a predetermined value.

2. The apparatus according to claim 1, wherein said exposure-amount detecting means detects the proper amount of exposure when the second and third focus evaluation values are detected.

3. An image sensing apparatus comprising:

an image sensing device for converting an optical image to an electric signal;

focus evaluation-value detecting means for detecting a focus evaluation value, which indicates degree of focusing of the optical image, by using said image sensing device;

focus adjusting means for performing focus adjustment, which is for focusing the optical image on said image sensing device, based upon the detected focus evaluation value;

exposure-amount detecting means for detecting a proper amount of exposure by using said image sensing device;

exposure adjusting means for performing exposure adjustment in accordance with the detected proper amount of exposure:

a first release switch for designating start of the focus adjustment and start of the exposure adjustment;

main-exposure image sensing means for performing main exposure after the adjustments of focus and exposure;

a second release switch for designating start of the main exposure;

an auto-focus lock switch being set to an auto-focus mode; and a diaphragm for limiting amount of exposing light impinging upon said image sensing device;

wherein when said auto-focus lock switch is not in the auto-focus mode, said focus evaluation-value detecting means detects one focus evaluation value upon making aperture diameter of said diaphragm the same as that which prevails when main exposure is performed after the focus adjustment is carried out upon placing the diaphragm in an opened state in response to a command from said first release switch, and detects another focus evaluation value in accordance with a diaphragm state approximately the same as that at main exposure in response to a command from said second release switch; and said main exposure image sensing means compares the one and another focus evaluation values and performs main exposure when the difference between these values is less than a predetermined value;

and when said auto-focus lock switch is in the auto-focus mode, said main exposure image sensing means performs main exposure as is in response to a command from said second release switch without the one and another focus evaluation values being detected.

* * * * *

UNITED STATES PATENT AND TRADEMARK OFFICE
CERTIFICATE OF CORRECTION

PATENT NO. : 5,751,354
DATED : May 12, 1998
INVENTOR(S) : Masao Suzuki, et al.

It is certified that error appears in the above-identified patent and that said Letters Patent is hereby corrected as shown below:

Col. 1, line 41, delete "10a" and insert -- 100a --.

Col. 10, line 46, delete "R1" and insert -- R0 --.

Col. 12, line 66, delete "a" and insert -- $\underline{a}$ --.

Col. 15, line 38, delete "b" and insert -- $\underline{b}$ --.

Col. 15, line 41, delete "b" and insert -- $\underline{b}$ --.

Face Page, item [56], second column, line 1, delete "5,368,137" and insert -- 5,363,137 --.

Signed and Sealed this

Twenty-ninth Day of December, 1998

Attest:

BRUCE LEHMAN

*Attesting Officer*     *Commissioner of Patents and Trademarks*